US012466836B2

(12) United States Patent
Li et al.

(10) Patent No.: US 12,466,836 B2
(45) Date of Patent: Nov. 11, 2025

(54) SPIROPYRAN HYDROGELS AND LIGHT-DRIVEN EXPANSION THEREOF

(71) Applicant: Northwestern University, Evanston, IL (US)

(72) Inventors: Chuang Li, Evanston, IL (US); Samuel I. Stupp, Evanston, IL (US)

(73) Assignee: Northwestern University, Evanston, IL (US)

(*) Notice: Subject to any disclaimer, the term of this patent is extended or adjusted under 35 U.S.C. 154(b) by 768 days.

(21) Appl. No.: 17/697,286

(22) Filed: Mar. 17, 2022

(65) Prior Publication Data

US 2022/0298169 A1    Sep. 22, 2022

Related U.S. Application Data

(60) Provisional application No. 63/162,268, filed on Mar. 17, 2021.

(51) Int. Cl.
  *C07D 491/107* (2006.01)
  *C08F 222/10* (2006.01)

(52) U.S. Cl.
  CPC .... *C07D 491/107* (2013.01); *C08F 222/1063* (2020.02); *C08F 2800/10* (2013.01); *C08F 2810/20* (2013.01); *C08F 2810/50* (2013.01)

(58) Field of Classification Search
  CPC ........... C07D 491/107; C08F 222/1063; C08F 2800/10; C08F 2810/20; C08F 2810/50
  See application file for complete search history.

(56) References Cited

U.S. PATENT DOCUMENTS

2008/0311495 A1* 12/2008 Norsten ................... G03C 1/73
                                                              430/286.1

OTHER PUBLICATIONS

Kamenjicki et al. Photoswitchable Spirobenzopyran-based photochemically controlled photonic Crystals. Adv Funct. Mater. 15, 1401-1406 (Year: 2005).*
Zhang et al. Multi-responsive hydrogel actuator with photo-switchable color changing behaviors, Dyes and Pigments, 174, 108042 (Year: 2020).*
Stupp et al. Light-Driven Expansion of Spiropyran Hydrogels JACS 2020, 142, 8447-8453 (Year: 2020).*
Aonbangkhen et al., Reversible Control of Protein Localization in Living Cells Using a Photocaged-Photocleavable Chemical Dimerizer. J Am Chem Soc. Sep. 26, 2018;140(38):11926-11930.
Bertrand et al., Photo-responsive polymers: synthesis and applications. Polym. Chem. 2017, 8 (1), 52-73.
Burgie et al., Phytochromes: an atomic perspective on photoactivation and signaling. Plant Cell. Dec. 2014;26(12):4568-83.
Carruthers. Some Modern Methods of Organic Synthesis, 3rd Edition, Cambridge University Press, Cambridge, 1987. TOC only. 7 pages.
Chen et al., Artificial muscle-like function from hierarchical supramolecular assembly of photoresponsive molecular motors. Nat Chem. Feb. 2018;10(2):132-138.
Epstein et al., Modulating Noncovalent Cross-links with Molecular Switches. J Am Chem Soc. Feb. 27, 2019;141(8):3597-3604.
Francis et al., Spiropyran based hydrogels actuators—Walking in the light. Sensor Actuat. B-Chem. 2017, 250, 608-616.
Fu et al., Photocontrolled Fluorescence "Double-Check" Bioimaging Enabled by a Glycoprobe-Protein Hybrid. J Am Chem Soc. Jul. 18, 2018;140(28):8671-8674.
Gelebart et al., Making waves in a photoactive polymer film. Nature. Jun. 28, 2017;546(7660):632-636.
Hohl et al., (De)bonding on Demand with Optically Switchable Adhesives. Adv. Opt. Mater. 2019, 7 (16), 1900230. 1-25.
Hu et al., Photoactuators for Direct Optical-to-Mechanical Energy Conversion: From Nanocomponent Assembly to Macroscopic Deformation. Adv Mater. Dec. 2016;28(47):10548-10556.
Irie. Diarylethenes for Memories and Switches. Chem Rev. May 10, 2000;100(5):1685-1716.
Klajn. Spiropyran-based dynamic materials. Chem Soc Rev. Jan. 7, 2014;43(1):148-84.
Kloxin et al., Photodegradable hydrogels for dynamic tuning of physical and chemical properties. Science. Apr. 3, 2009;324(5923):59-63.
Kohl-Landgraf et al., Ultrafast dynamics of a spiropyran in water. J Am Chem Soc. Aug. 29, 2012;134(34):14070-7.
Kortekaas et al., The evolution of spiropyran: fundamentals and progress of an extraordinarily versatile photochrome. Chem Soc Rev. Jun. 17, 2019;48(12):3406-3424.
Kundu et al., Controlling the lifetimes of dynamic nanoparticle aggregates by spiropyran functionalization. Nanoscale. Nov. 24, 2016;8(46):19280-19286.
Lancia et al., Life-like motion driven by artificial molecular machines. Nat. Rev. Chem. 2019, 3 (9), 536-551.
Larock. Comprehensive Organic Transformations, 3rd Edition, John Wiley & Sons, Inc., New York, 2018. TOC only. 24 pages.
Li et al., Design and Applications of Photoresponsive Hydrogels. Adv Mater. Jun. 2019;31(26):e1807333. 1-17.
Li et al., Light-Responsive Smart Soft Matter Technologies. Adv. Opt. Mater. 2019, 7 (16), 1901160. 1-3.
Lu et al., Tunable Photocontrolled Motions Using Stored Strain Energy in Malleable Azobenzene Liquid Crystalline Polymer Actuators. Adv Mater. Jul. 2017;29(28).
Merino. Synthesis of azobenzenes: the coloured pieces of molecular materials. Chem Soc Rev. Jul. 2011;40(7):3835-53.
Moldenhauer et al., Water-Soluble Spiropyrans with Inverse Photochromism and Their Photoresponsive Electrostatic Self-Assembly. Chemistry. Mar. 17, 2017;23(16):3966-3978.
Muraoka et al., Light-triggered bioactivity in three dimensions. Angew Chem Int Ed Engl. 2009;48(32):5946-9.
Ouyang et al., A Generalizable Strategy for the 3D Bioprinting of Hydrogels from Nonviscous Photo-crosslinkable Inks. Adv Mater. Feb. 2017;29(8). 1-7.

(Continued)

*Primary Examiner* — Katarzyna I Kolb
(74) *Attorney, Agent, or Firm* — David W. Staple; Casimir Jones, S.C.

(57) ABSTRACT

Provided herein are sulfonate-based water-soluble photoswitches that, in contrast to existing systems, trigger a volumetric expansion in hydrogels upon exposure to photons; contraction is in turn observed under dark conditions in a highly reversible manner.

20 Claims, 28 Drawing Sheets

(56) References Cited

OTHER PUBLICATIONS

Palczewski et al., Chemistry and biology of the initial steps in vision: the Friedenwald lecture. Invest Ophthalmol Vis Sci. Oct. 22, 2014;55(10):6651-72.
Qian et al., Artificial phototropism for omnidirectional tracking and harvesting of light. Nat Nanotechnol. Nov. 2019; 14(11):1048-1055.
Ruskowitz et al., Photoresponsive biomaterials for targeted drug delivery and 4D cell culture. Nat. Rev. Mater. 2018, 3 (2), 17087. 1-18.
Russew et al., Photoswitches: from molecules to materials. Adv Mater. Aug. 17, 2010;22(31):3348-60.
Satoh et al., Fast-reversible light-driven hydrogels consisting of spirobenzopyran-functionalized poly(N-isopropylacrylamide). Soft Matter 2011, 7 (18), 8030-8034.
Sendai et al., Photoreconfigurable supramolecular nanotube. J Am Chem Soc. Aug. 7, 2013;135(31):11509-12.
Smith et al., Leaf form and photosynthesis. Bioscience 1997, 47 (11), 785-793.
Smith. March's Advanced Organic Chemistry: Reactions, Mechanism, and Structure, 7th Edition, John Wiley & Sons, Inc., New York, 2013. TOC only. 11 pages.
Sorrell. Organic Chemistry, 2nd edition, University Science Books, Sausalito, 2006. TOC only. 18 pages.
Sumaru, K.; Kameda, M.; Kanamori, T.; Shinbo, T., Characteristic phase transition of aqueous solution of poly(N-isopropylacrylamide) functionalized with spirobenzopyran. Macromolecules 2004, 37 (13), 4949-4955.
Takashima et al., Expansion-contraction of photoresponsive artificial muscle regulated by host-guest interactions. Nat Commun. 2012;3:1270. 1-8.
Ter Schiphorst et al., Molecular Design of Light-Responsive Hydrogels, for in Situ Generation of Fast and Reversible Valves for Microfluidic Applications. Chem. Mater. 2015, 27 (17), 5925-5931.
Waldeck. Photoisomerization Dynamics of Stilbenes. Chem. Rev. 1991, 91 (3), 415-436.
Wang et al., Multistimuli responsive organogels based on a new gelator featuring tetrathiafulvalene and azobenzene groups: reversible tuning of the gel-sol transition by redox reactions and light irradiation. J Am Chem Soc. Mar. 10, 2010;132(9):3092-6.
Weingarten et al., Self-assembling hydrogel scaffolds for photocatalytic hydrogen production. Nat Chem. Nov. 2014;6(11):964-70.
White et al., Programmable and adaptive mechanics with liquid crystal polymer networks and elastomers. Nat Mater. Nov. 2015;14(11):1087-98.
Xiao et al., Moving Droplets in 3D Using Light. Adv Mater. Aug. 2018;30(35):e1801821. 1-8.
Yang et al., Photocatalysis: From Fundamental Principles to Materials and Applications. Acs Appl. Energy Mater. 2018, 1 (12), 6657-6693.
Zeng et al., Light Robots: Bridging the Gap between Microrobotics and Photomechanics in Soft Materials. Adv Mater. Jun. 2018;30(24):e1703554. 1-9.
Ziolkowski et al., Self-protonating spiropyran-co-NIPAM-co-acrylic acid hydrogel photoactuators. Soft Matter 2013, 9 (36), 8754-8760.

* cited by examiner ature that mimic the complex functions of living systems. Merocyanine dyes that convert to spiropyran moieties upon exposure to visible light have been extensively studied as they can be incorporated in hydrated covalent networks that will expel water when this conversion occurs and induce a volumetric shrinkage.

SPIROPYRAN HYDROGELS AND LIGHT-DRIVEN EXPANSION THEREOF

CROSS-REFERENCE TO RELATED APPLICATIONS

The present invention claims the priority benefit of U.S. Provisional Patent Application 63/162,268, filed Mar. 17, 2021, which is incorporated by reference in its entirety.

STATEMENT REGARDING FEDERAL FUNDING

This invention was made with government support under DE-SC0000989 awarded by the Department of Energy. The government has certain rights in the invention.

FIELD

Provided herein are sulfonate-based water-soluble photoswitches that, in contrast to existing systems, trigger a volumetric expansion in hydrogels upon exposure to photons; contraction is in turn observed under dark conditions in a highly reversible manner.

BACKGROUND

The incorporation of molecular switches in organic structures is of great interest in the chemical design of stimuli-responsive materials that mimic the complex functions of living systems. Merocyanine dyes that convert to spiropyran moieties upon exposure to visible light have been extensively studied as they can be incorporated in hydrated covalent networks that will expel water when this conversion occurs and induce a volumetric shrinkage.

DEFINITIONS

Figure 1:
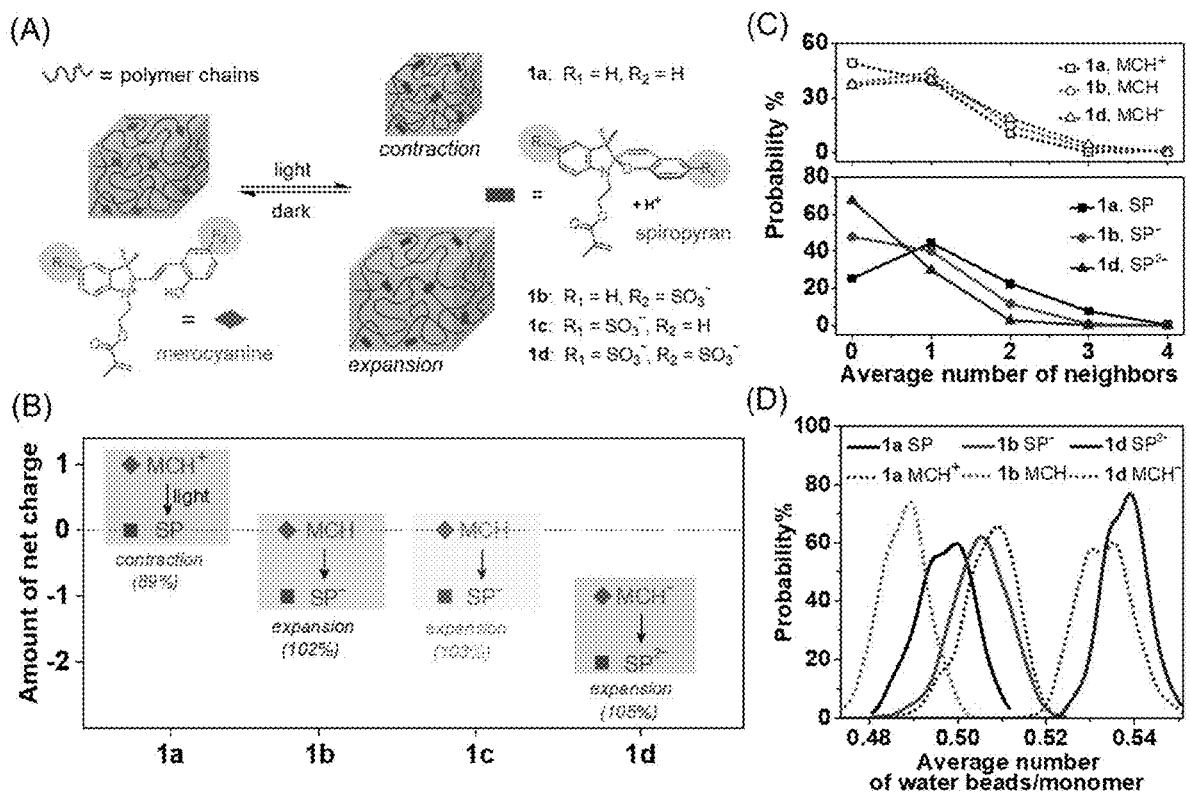
FIG. 1. (A) Design of novel polymerizable, water-soluble spiropyrans (molecules 1b-1d) for photoexpansion rather than the well-known photocontraction behavior in water-insoluble spiropyrans (molecule 1a). (B) Plot of the expected amount of net charge and corresponding measured volume changes before and after light irradiation for different moieties 1a-1d and the net volume change after irradiation. (C) Plot of the probability of different molecules having nearest MCH or SP neighbors within 7 Å for both the ring-opened form (top) and ring-closed form (bottom) using a radial distribution (see FIG. S10) function calculated from coarse-grained simulations. (D) Plot of the probability of finding the indicated average number of water beads (four waters per MARTINI bead) with the ring-opened (MCH) and ring-closed (SP) form in monomers 1a, 1b, and 1d calculated from the coarse-grained simulations used for the data shown in C.

Definitions of specific functional groups and chemical terms are described in more detail below. For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in Sorrell, Organic Chemistry, 2$^{nd}$ edition, University Science Books, Sausalito, 2006; Smith, March's Advanced Organic Chemistry: Reactions, Mechanism, and Structure, 7$^{th}$ Edition, John Wiley & Sons, Inc., New York, 2013; Larock, Comprehensive Organic Transformations, 3$^{rd}$ Edition, John Wiley & Sons, Inc., New York, 2018; and Carruthers, Some Modern Methods of Organic Synthesis, 3$^{rd}$ Edition, Cambridge University Press, Cambridge, 1987; the entire contents of each of which are incorporated herein by reference.

As used herein, the term "alkyl" means a straight or branched saturated hydrocarbon chain. An alkyl chain can include, for example, 1 to 16 carbon atoms ($C_1$-$C_{16}$ alkyl), 1 to 14 carbon atoms ($C_1$-$C_{14}$ alkyl), 1 to 12 carbon atoms ($C_1$-$C_{12}$ alkyl), 1 to 10 carbon atoms ($C_1$-$C_{10}$ alkyl), 1 to 8 carbon atoms ($C_1$-$C_8$ alkyl), 1 to 6 carbon atoms ($C_1$-$C_6$ alkyl), 1 to 4 carbon atoms ($C_1$-$C_4$ alkyl), 1 to 3 carbon atoms ($C_1$-$C_3$ alkyl) or 1 to 2 carbon atoms ($C_1$-$C_2$ alkyl). Representative examples of alkyl include, but are not limited to, methyl, ethyl, n-propyl, iso-propyl, n-butyl, sec-butyl, iso-butyl, and tert-butyl.

As used herein, the term "alkoxy" refers to an alkyl group, as defined herein, appended to the parent molecular moiety through an oxygen atom. Representative examples of alkoxy include, but are not limited to, methoxy, ethoxy, propoxy, 2-propoxy, butoxy and tert-butoxy.

As used herein, the term "halogen" or "halo" means F, Cl, Br, or I.

As used herein, the term "nitro" means an —NO$_2$ group.

As used herein, the term "(meth)" designates optional methyl substitution. For example, the term "(meth)acrylic acid" encompasses both acrylic acid and methacrylic acid.

DETAILED DESCRIPTION

Provided herein are sulfonate-based water-soluble photoswitches that, in contrast to existing systems, trigger a volumetric expansion in hydrogels upon exposure to photons; contraction is in turn observed under dark conditions in a highly reversible manner.

Natural systems transduce light energy to drive a variety of useful processes, such as photosynthesis in leaves (Ref. 1; incorporated by reference in its entirety), photoactivation of pigments that enables human vision (Ref. 2; incorporated by reference in its entirety), and phototropic motion induced by photoisomerization of phytochromes (Ref. 3; incorporated by reference in its entirety). These natural light-driven systems have inspired the synthetic development of artificial light responsive materials (Refs. 4-5; incorporated by reference in their entireties) that can perform complex functions with applications in catalysis (Refs. 6-7; incorporated by reference in their entireties), sensing (Ref. 8; incorporated by reference in its entirety), adhesion (Ref. 9; incorporated by reference in its entirety), bioengineering (Refs. 10-11; IBr2), drug delivery (ref 12; incorporated by reference in its entirety) as well as soft robotics (Refs. 13-15; incorporated by reference in their entireties). Light offers inherent advantages over other stimuli, including the possibility to instantly turn on or off the signal, it does not require contact with the photoresponsive substance, wavelength variation is possible, and the exposure to the chemical system can have spatial and directional specificity. All these advantages have motivated the development of photoactive materials based on polymers, liquid crystal elastomers and gels (Refs. 16-19; incorporated by reference in their entireties). Photoresponsive hydrogels are particularly interesting as biomaterials due to their structural similarity to the extracellular matrix and the possibility of changing mechanical properties through light exposure (ref 20; incorporated by reference in its entirety). Researchers have incorporated various photoactive components such as photocleavable groups[21-22], photothermal agents[23], and molecular photoswitches[24] into hydrogel matrices to tune their physical, chemical and biological properties (Refs. 21-24; incorporated by reference in their entireties). Molecular photoswitches, such as azobenzenes, diarylethenes, stilbenes, spiropyrans, and their derivatives are useful because they can selectively and reversibly reconfigure conformations upon irradiation (Refs. 25-28; incorporated by reference in their entireties). For example, Harada et al. reported on a supramolecular hydrogel in which light is used to reversibly control the association between a photoswitchable azobenzene guest and an α-cyclodextrin host (Ref 29; incorporated by reference in its entirety). This interaction acts as a supramolecular crosslink causing reversible expansion and contraction of the hydrogel with irradiation. More recently, Feringa et al. reported a string-shaped hydrogel made of macroscopically aligned supramolecular assemblies of photoresponsive molecular motors that can bend in response to light (ref 30; incorporated by reference in its entirety). These examples demonstrate that conformational changes in photoswitchable molecules can induce macroscopic actuation in hydrogels.

Spiropyrans are interesting photoswitches that interconvert between two isomers, a ring-closed spiropyran form (SP) and ring-opened merocyanine form (MC), which differ in dipole moment, molecular volume, polarity, and net charge (ref. 31; incorporated by reference in its entirety). Recent work has shown that the incorporation of spiropyrans in materials can cause significant changes in their physical and chemical properties upon irradiation, leading for example to phase transitions of thermoresponsive polymers, removal of crosslinks in polymer networks, reconfiguration of a supramolecular nanotube, self-assembly of nanoparticles, movement of droplets, as well as macroscopic actuation such as bending and walking (Refs. 32-40; incorporated by reference in their entireties). However, the spiropyrans used in these systems were water-insoluble and required organic solvents for the preparation of materials which limits their functionality. Although water-soluble spiropyrans have been reported (Ref 41; incorporated by reference in its entirety) and used as small molecules for electrostatic assembly (Ref. 42; incorporated by reference in its entirety), there are no examples known of water-soluble spiropyrans containing polymerizable sites that can be chemically incorporated into hydrogel networks to tune their physical properties using light.

Provided herein are sulfonate-based polymerizable water-soluble spiropyran molecules that can be covalently attached to a hydrogel network. The synthesis of such spiropyran molecules and demonstration of their photoactuation behavior is demonstrated herein.

Figure 18:
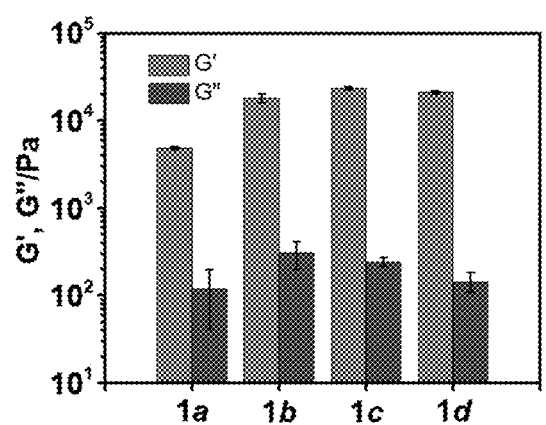
FIG. 18 Rheology measurement of hydrogel samples containing 1a-1d moieties.
Figure 19:
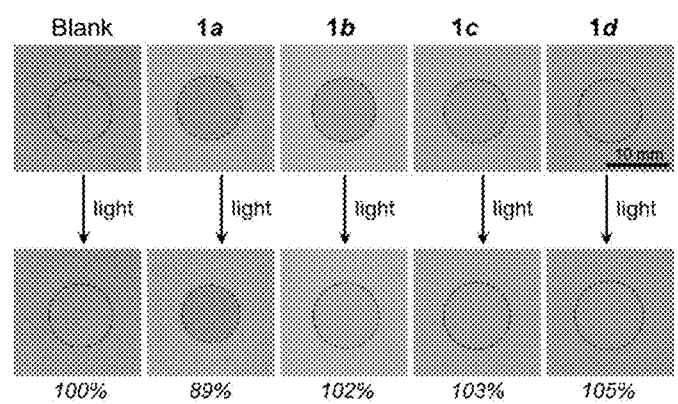
FIG. 19. Photographs of hydrogel dishes (10 mm in diameter, 0.5 mm thick) containing different spiropyran moieties before (top) and after irradiation with light (bottom). The percentage indicates the net volume change after irradiation with light.
Figure 20:
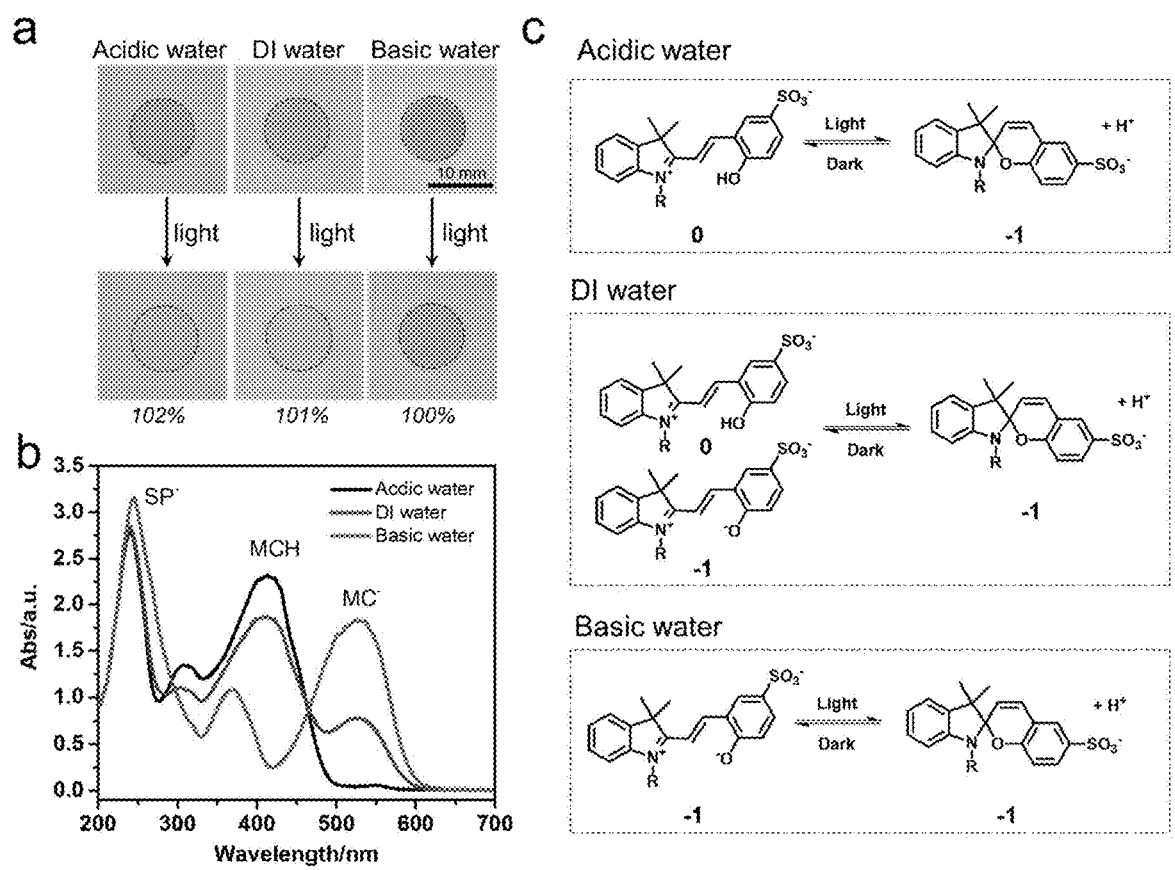
FIG. 20. (a) Photographs of hydrogel dishes (10 mm in diameter, 0.5 mm thick) containing 1b moiety before (top) and after irradiation with light (bottom) in acidic (left), DI (middle) and basic (right) water. The percentage indicates the volume ratio change after irradiation with light. (b) UV-Vis spectra of 1b moiety (0.2 mM) in different water solutions. (c) Chemical structures of 1b moiety before and after light irradiation under different water conditions.
Figure 21:
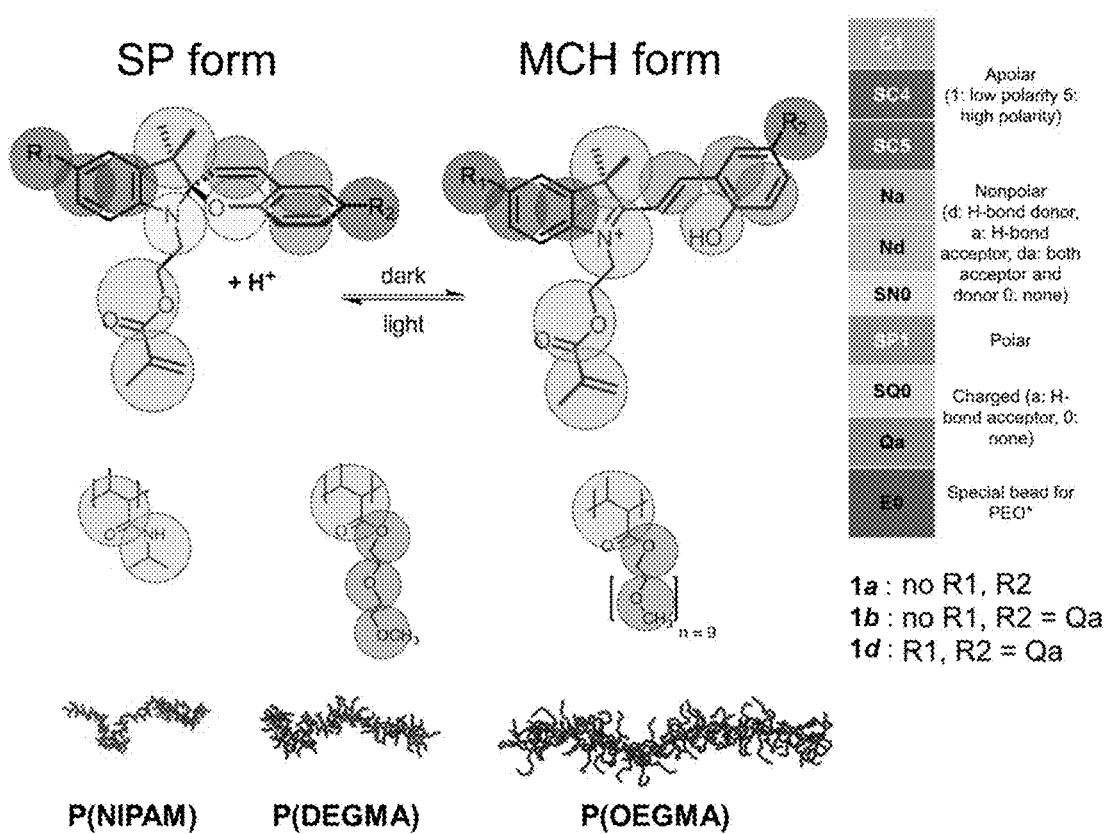
FIG. 21. The chemical structures and MARTINI bead types for NIPAM, DEGMA and OEGMA monomers and spiropyran in light (SP form) and dark (MCH form) conditions. Equilibrated single chain for P(NIPAM) is shown, where the backbone is blue, the NIPAM side chains green, DEGMA/OEGMA side chains red and MCH yellow. *See Grunewald et al.[8] for E0 bead type.
Figure 22:
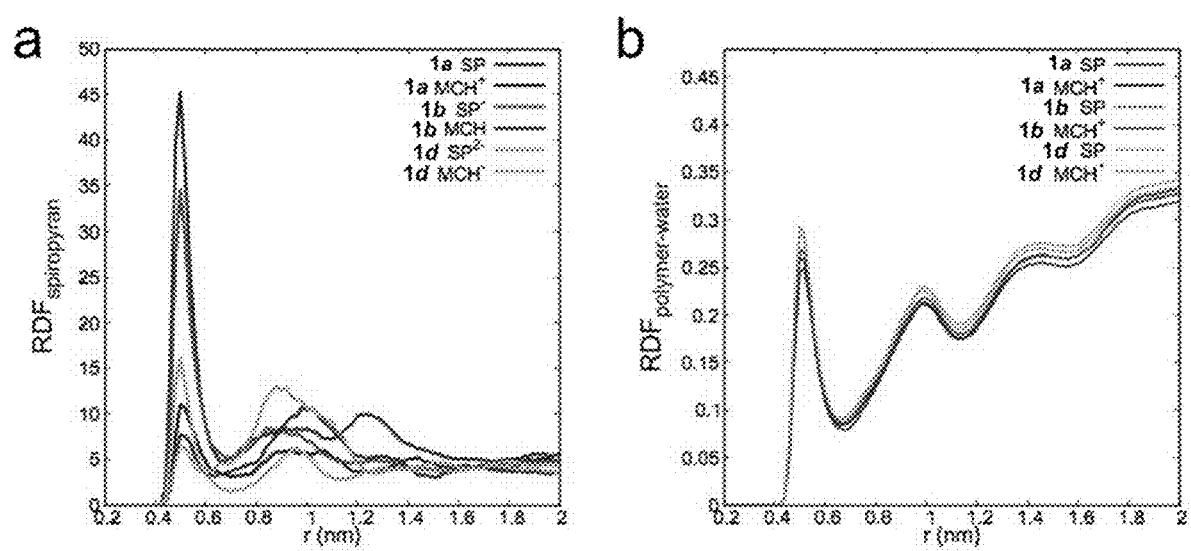
FIG. 22. Radial distribution function (RDF) for the spiropyran molecules calculated averaged over the last 500 ns of each simulation. (e) RDF between the polymer and water molecules averaged over the last 500 ns of each simulation.
Figure 23:
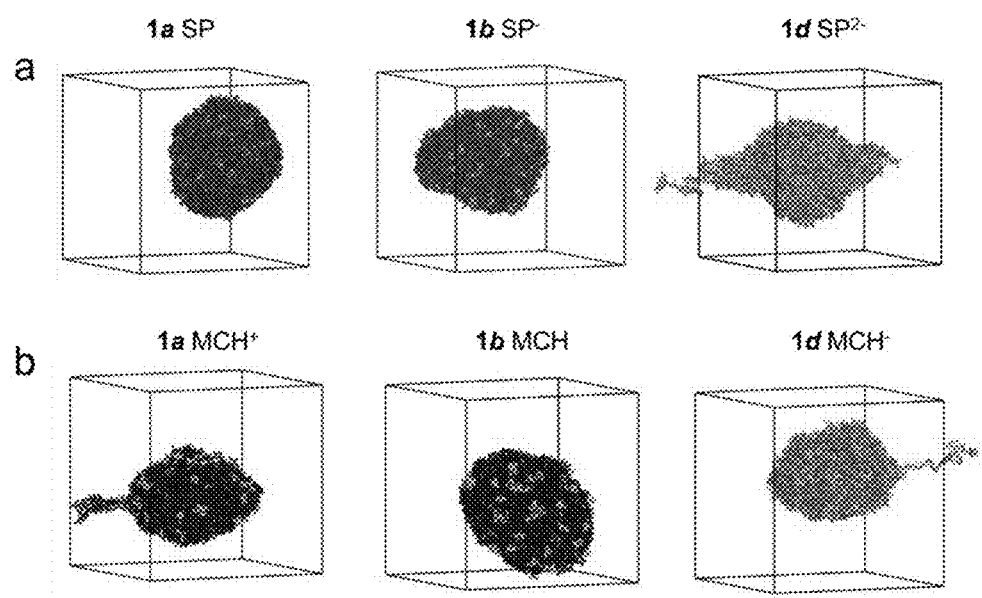
FIG. 23. Snapshots of final conformations at 10 s of (a) light (SP) and (b) dark (MCH) conditions using 1a, 1b and 1d spiropyran structures. Water and ions are omitted for clarity. SP isomers are colored in orange while MC isomers are colored in yellow.
Figure 24:
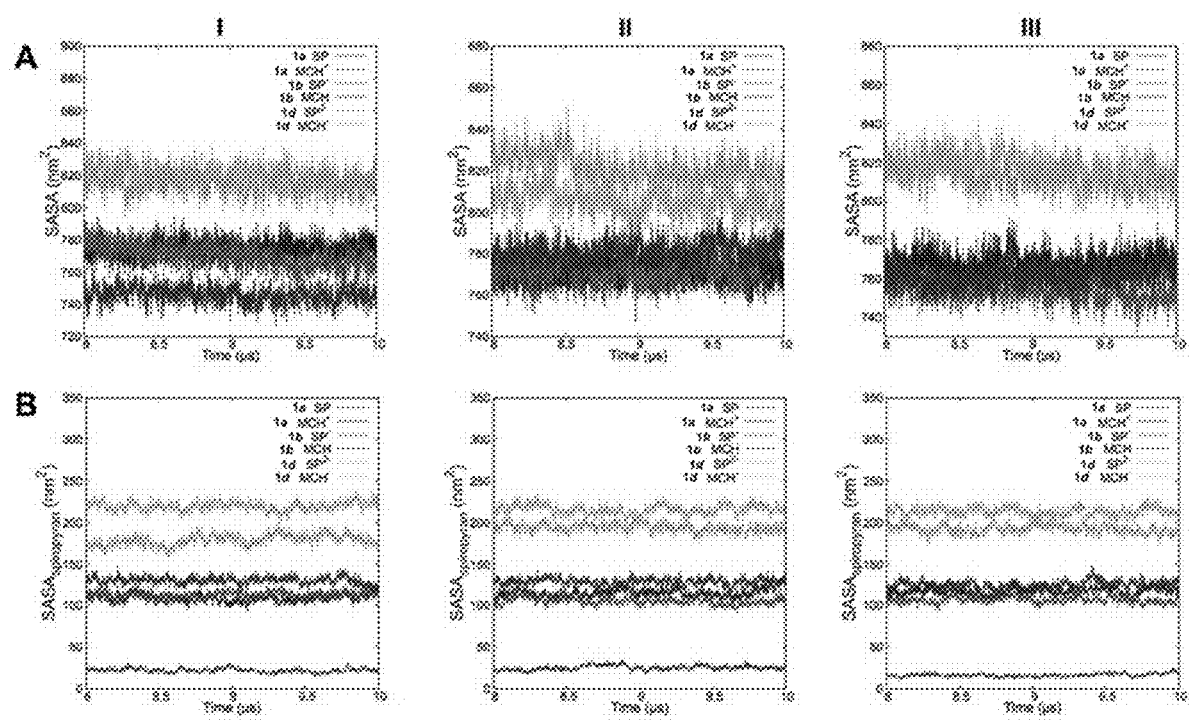
FIG. 24. The solvent accessible surface area (SASA) calculated for each system using (a) the whole polymer chain and (b) only the spiropyran molecules for three independent simulations.

Spiropyran molecules containing both a polymerizable methacrylate group and sulfonate groups were initially synthesized to achieve water solubility (1a-1d, see FIGS. 5-17). These molecules were covalently incorporated into crosslinked polymer networks using aqueous free-radical polymerization in the presence of N-isopropylacrylamide monomers, N,N'-methylenebisacrylamide crosslinkers and 2,2'-azobis(2-methylpropionamidine) dihydrochloride photoinitiators (FIG. 18). After incubation in acidic water (5 mM HCl) in the dark, the hydrogel containing molecule 1a without any sulfonate groups was found to contract upon irradiation due to isomerization of the positively charged hydrophilic merocyanine form (MCH$^+$) to the uncharged hydrophobic SP form, in agreement with previously reported results[39-40]. In contrast, hydrogels containing sulfonated spiropyrans (1b-1d) were found to expand in volume under the same irradiation conditions (FIG. 1A). We hypothesized that this photoexpansion behavior is related to a change in charge after light irradiation. FIG. 1B shows that the net charge of 1a decreases from +1 to 0, resulting in a light-driven contraction to 89% of its original volume (FIG. 19). In contrast, the net charge in 1b and 1c increases from 0 to −1 upon light irradiation, which may explain the observed photoexpansion to 102% and 103% of their original volume, respectively. Furthermore, the amount of net charge in 1d increases from −1 to −2 resulting in a greater light-driven volume expansion (105% of the original volume). In addition, we observed that this light-induced expansion only occurs in acidic environments where the phenol group of merocyanine is protonated (FIG. 20).

To gain atomistic insight into this photoexpansion behavior, we carried out molecular dynamics (MD) simulations using a coarse-grained (CG) model (see SI and FIGS. 21-25 for details). The presence of SO$_3^-$ groups can affect the interactions between spiropyran molecules, which we quantified by calculating the number of neighboring spiropyran molecules found in the first solvation shell of a given spiropyran (FIG. 1C). All three spiropyrans (1a, 1b and 1d)

appear to have predominantly zero or one other spiropyran neighbor in their first solvation shells in the MCH form (we did not model here 1c since its charges are so similar to 1b). The simulations show that in systems containing the non-sulfonated spiropyran 1a the isomerization from MC to SP under light leads to the formation of clusters among the hydrophobic moieties. In contrast, systems containing sulfonated spiropyrans (1b and 1d) which experience an increase in charge upon irradiation do not form clusters presumably as a result of repulsive electrostatic interactions. We also found that the interaction between spiropyran and water decreased for 1a and increased for 1b and 1d upon irradiation, indicating that the photoinduced decrease (or increase) in charge density facilitates water diffusion out of and into the gel (FIG. 1D, S9). These simulations provide insight on the role of water diffusion in the observed photoexpansion of hydrogels containing 1b-1d.

Figure 2:
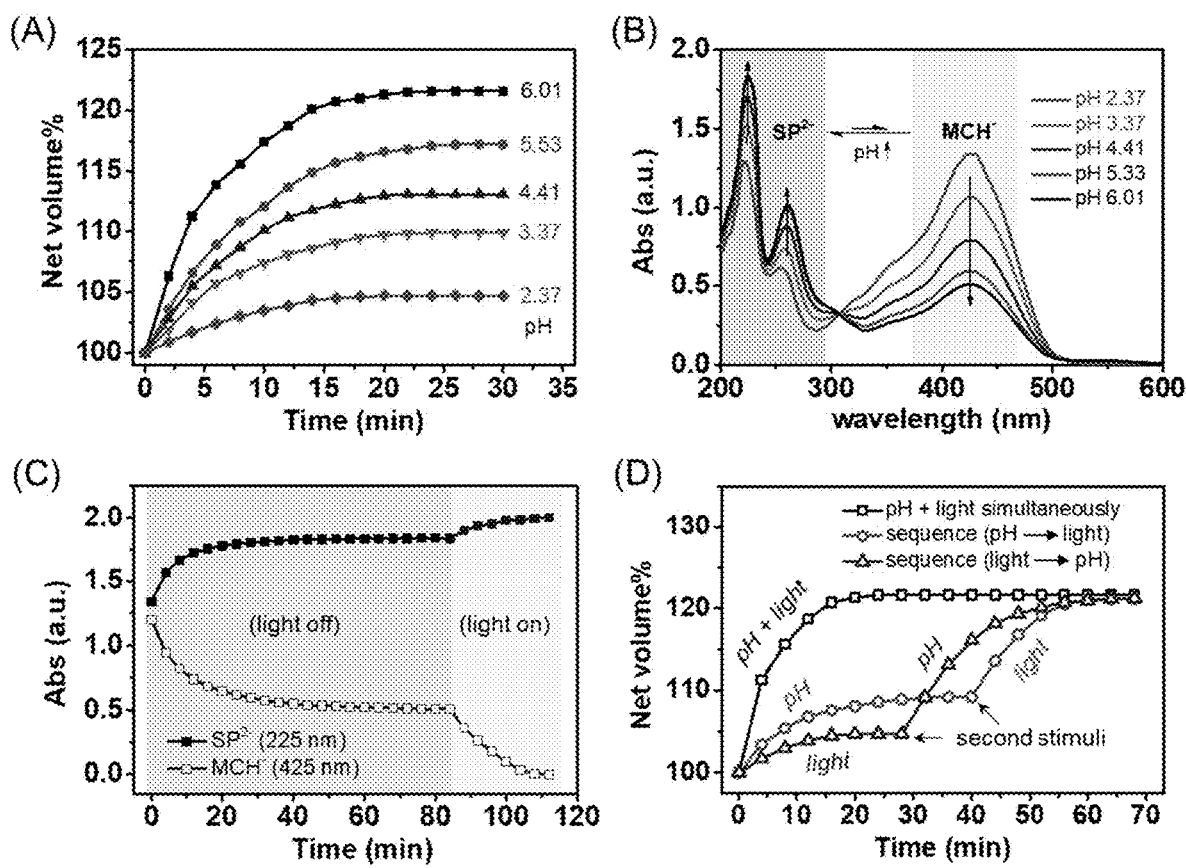
FIG. 2. (A) Expansion kinetics of hydrogel samples containing photoswitch 1d upon light irradiation at different values of pH. (B) UV-Vis spectra of water soluble spiropyran (1d) at different pH values. (C) Plot of UV-Vis absorbance of MCH⁻ and SP²⁻ as a function of time for solutions containing photoswitch 1d under dark conditions followed by irradiation after pH was elevated from 2.37 to 6.01. (D) Expansion kinetics of hydrogel samples containing 1d exposed to sequential stimuli of elevated pH followed by light or vice versa (red and blue curves) or simultaneous exposure to both stimuli (black curve).
Figure 26:
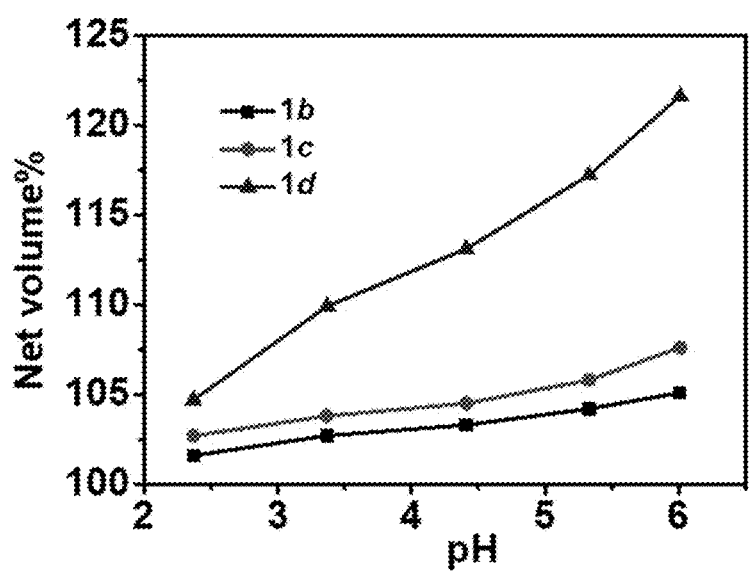
FIG. 26. Net volume changes of hydrogel samples made of different spiropyrans and PNIPAM polymer protonated in 5 mM of HCl first followed by transferred to water solutions with different pH values where the photoactuation was carried out immediately.
Figure 27:
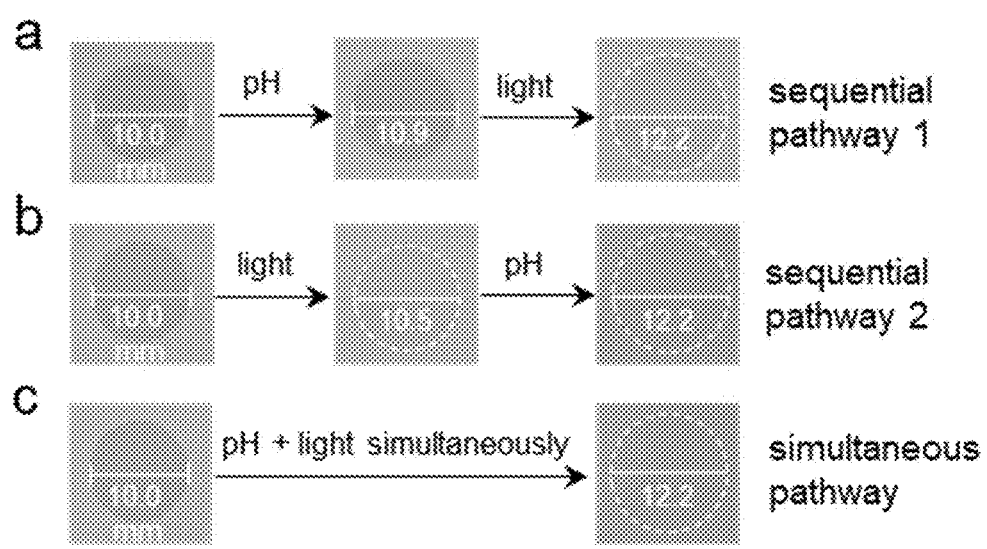
FIG. 27. Sequential or simultaneous activation of pH and light stimuli on hydrogel samples containing 1d moiety. (a) Activate pH stimulus first followed by light stimulus. (b) Activate light stimulus first followed by pH stimulus. (c) Simultaneous activation of pH and light stimuli.
Figure 28:
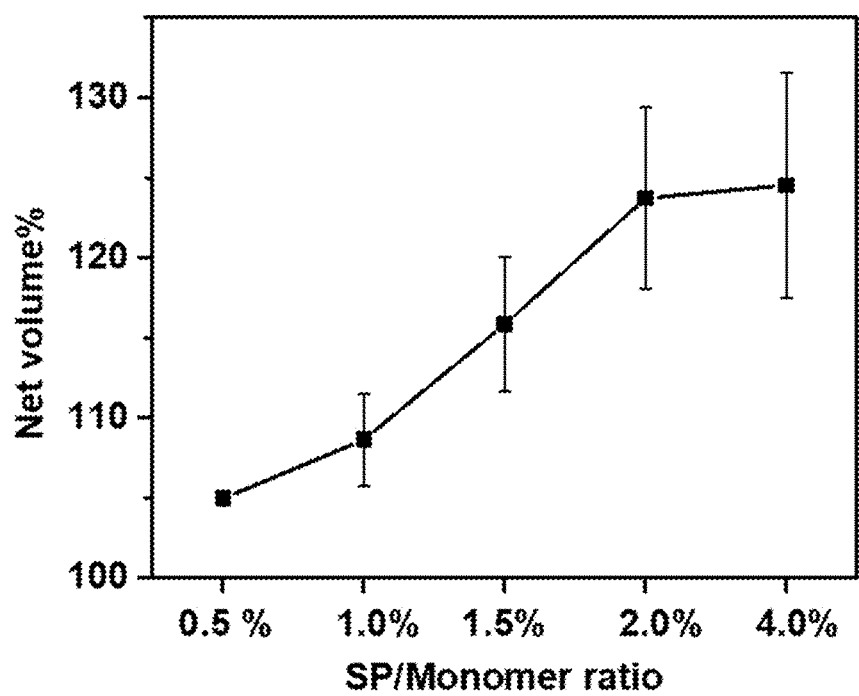
FIG. 28. Plot of net volume changes of hydrogel samples made of a fixed content of PNIPAM polymer (10 wt %) containing variable molar ratio of 1d moiety.

It was found that degree of photoexpansion can be tuned by varying the solution pH during light irradiation and we chose to test samples in a range of pH 2.5 to 6.0 based on the previously reported $pK_a$ value of the phenolate moiety of the sulfonated merocyanine[42]. For example, hydrogels containing the 1d moiety expanded to 105% of its original volume upon irradiation with light at a solution pH of 2.37. This ratio was found to increase gradually with increasing pH (FIG. 2A). A similar trend was observed for hydrogels containing 1b and 1c moieties (FIG. 26). UV-Vis spectra were collected using aqueous solutions containing the same concentration of disulfonated 1d at different pH values without irradiation. After equilibration overnight in the dark, it was found that the absorbance intensity of MCH⁻ at 425 nm decreased with increasing pH (FIG. 2B). This indicated that the reaction equilibrium between $SP^{2-}$ and MCH⁻ shifted toward $SP^{2-}$ with higher pH in the dark. This equilibration was tracked at pH 6.01 by following the intensity changes at 425 nm (MCH⁻) and 225 nm ($SP^{2-}$). FIG. 2C shows that in the dark the absorbance intensity of MCH⁻ spontaneously decreased while that of $SP^{2-}$ increased and eventually became constant after 84 min. The absorbance intensity of MCH⁻ decreased gradually to zero in 30 min under light irradiation, indicating complete isomerization to the $SP^{2-}$ form. This process was applied to hydrogel samples containing the 1d moiety, where we first observed spontaneous expansion in the dark with higher solution pH due to the re-equilibration of the reaction $SP^{2-} \leftrightarrow MCH^-$ to favor the $SP^{2-}$ form, followed by a secondary photoinduced expansion behavior when light is turned on (FIG. 2D, red circles). A different pathway was explored, namely applying the two stimuli separately to the same gel in reverse order and achieved the same final expansion ratio (FIG. 2D, blue triangles). Simultaneous activation with pH and light leads to faster expansion kinetics relative to either sequential pathways (FIG. 2D, black squares; FIG. 27). It was found that the photoexpansion is dependent on the total amount of the photoswitches grafted on PNIPAM polymers (FIG. 28). The expansion ability increases with a higher ratio of photoswitches, reaching a plateau at a 1:50 molar ratio. In experiments conducted during development of embodiments herein a 1:50 (SP/monomer) ratio was maintained, a water bath at pH of 2.37 was used to protonate the gel in the dark, and materials were then transferred to a water bath at pH 6.01 for photoactuation.

Figure 3:
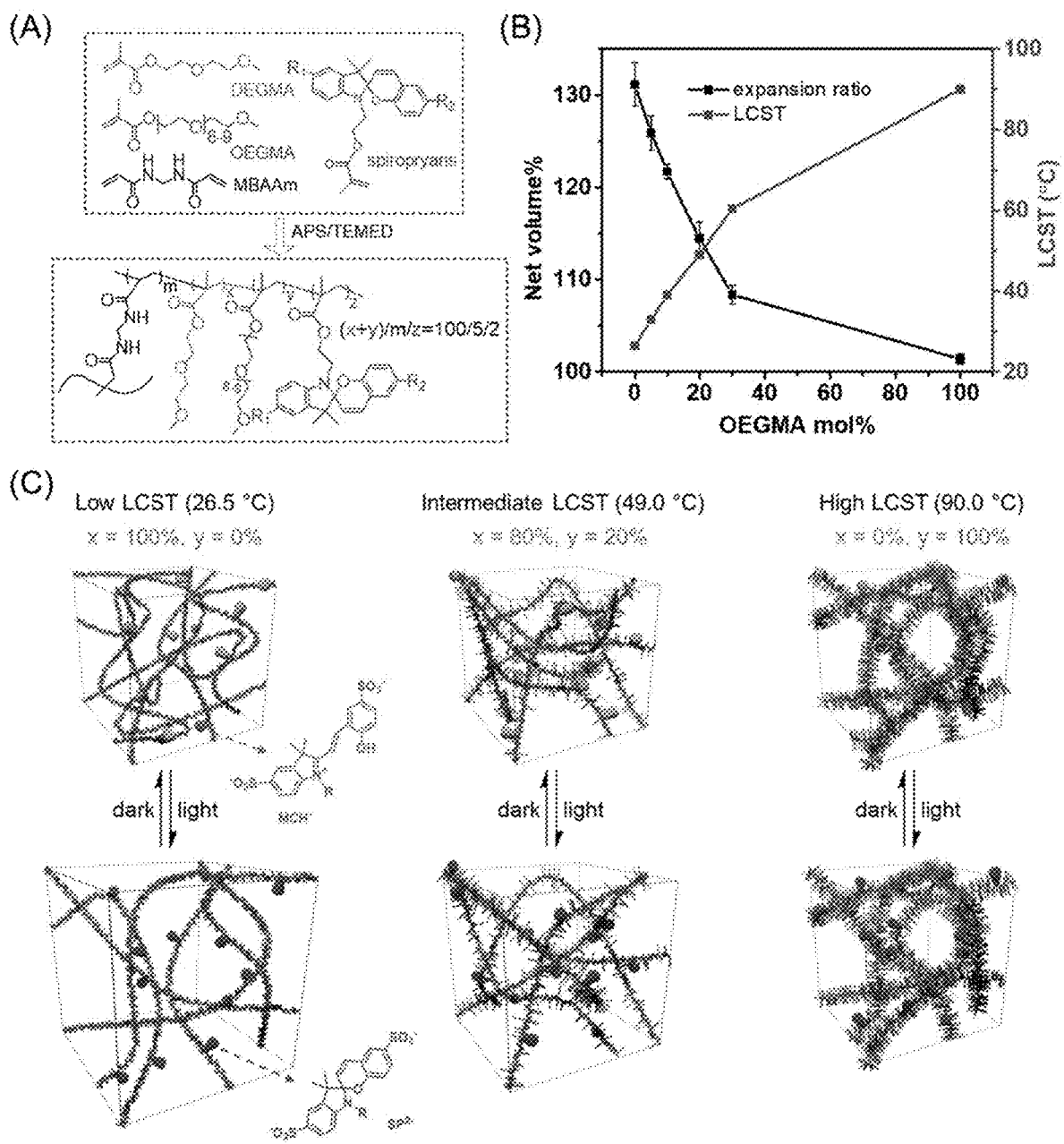
FIG. 3. (A) Synthesis of photoactive polymers with different LCSTs by varying the molar ratio of DEGMA and OEGMA. (B) Plots of photoinduced expansion ratio (black) of hydrogel samples containing 1d and of LCST (red) as a function of molar percentage OEGMA monomer in the network. (C) Schematic representation of light-induced expansion effect on hydrogel samples with different LCST.
Figure 25:
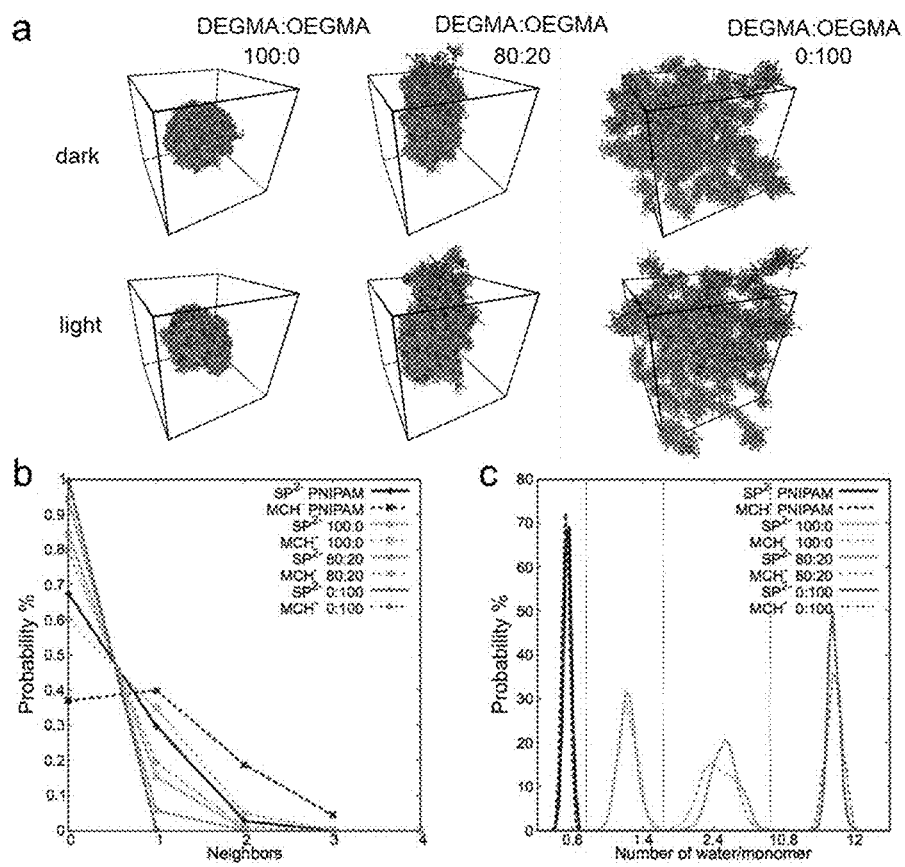
FIG. 25. (a) Snapshots of final conformations at 5 s of light (SP, bottom) and dark (MCH, top) conditions using 1d spiropyran and poly(DEGMA$_x$-co-OEGMA$_y$) networks. Water and ions are omitted for clarity. SP and MCH isomers are colored in red and magenta, respectively. The numbers represent the relative molar ratio of DEGMA and OEGMA. (b) Probability distribution of the number of spiropyrans in the first solvation of each spiropyran. (c) Average number of water beads (four waters per MARTINI bead) per monomer for different polymers in the ring-opened and ring-closed forms. The x-axis in (c) is shifted at location indicated by dashed lines to show all lines in one figure.
Figure 29:
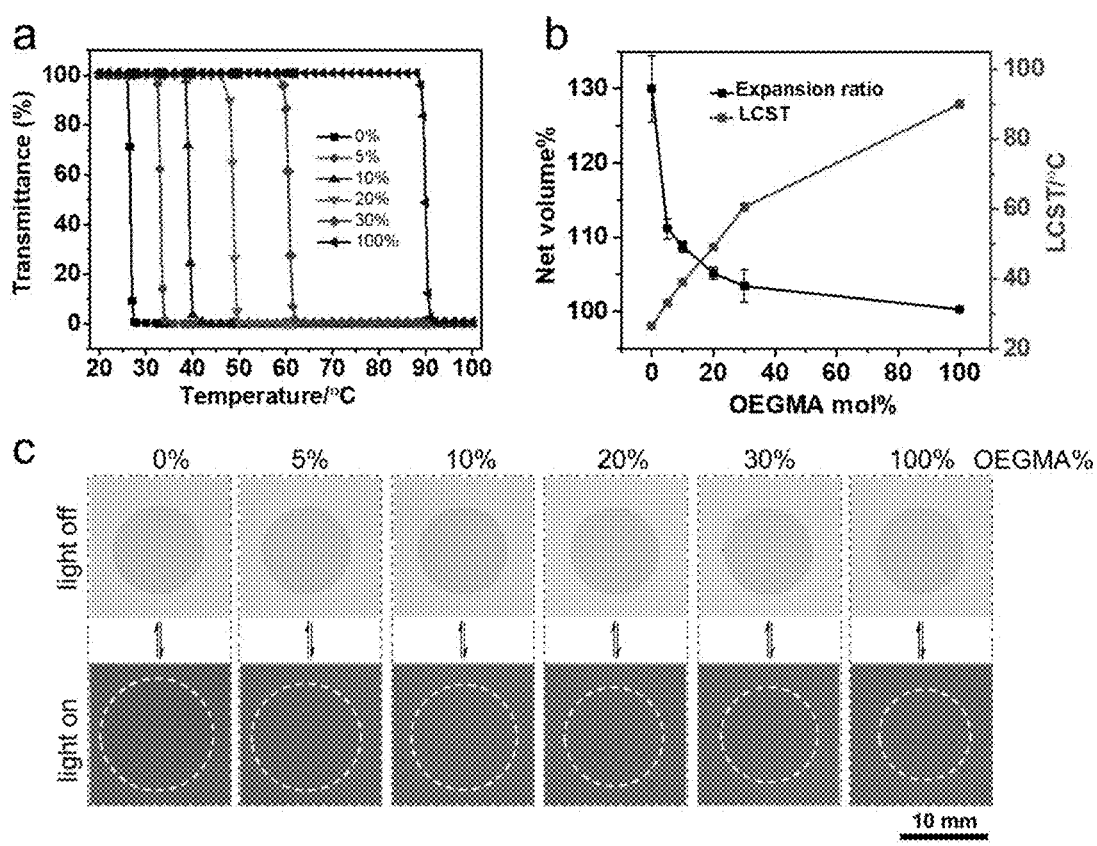
FIG. 29. (a) Transmittance measurement of poly(DEGMA$_x$-co-OEGMA$_y$) with a concentration of 3 mg/ml from 5° C. to 90° C. with a heating rate 1° C./min. The percentage indicates the molar percentage of OEGMA in relative to the copolymer. (b) Plot of net volume changes (black) of hydrogel samples made of 1b moiety (SP/monomer, 1/50) and poly(DEGMA$_x$-co-OEGMA$_y$) networks with variable LCSTs (red). (c) Photographs of dish-shaped hydrogel samples made of 1b moiety and variable molar ratio of OEGMA. The percentage on top of the photographs indicate the mole percentage of OEGMA in hydrogel.
Figure 30:
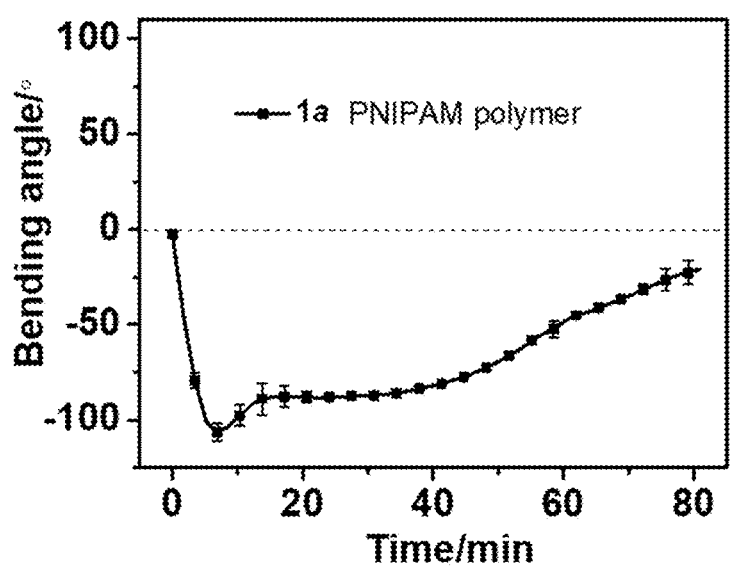
FIG. 30. Plot of the bending angle of photocontraction-induced hydrogel artificial muscles made of 1a and PNIAMP polymers versus light irradiation time.

In addition to the effect of pH, the extent of photoexpansion is also tunable by choosing different polymer backbones with variable lower critical solution temperature (LCST) (FIG. 29A). This can be achieved by replacing the PNIPAM with different molar ratios of di(ethylene glycol) methyl ether methacrylate (DEGMA) and oligo(ethylene glycol) methyl ether methacrylate (OEGMA, $M_n$ 500) during copolymerization (FIG. 3A). Keeping the concentration of spiropyrans and environmental pH constant, and the temperature fixed at room temperature, it was found that the photoexpansion of hydrogels containing 1d was inversely correlated with the LCST of the polymers used (FIG. 3B). The same trend was observed for hydrogels containing 1b (Figure S25B). Since the LCST of all polymers used is above room temperature, the polymer chains with a lower LCST will collapse and coil more than those with a higher LCST due to their hydrophobicity (FIG. 25). Upon irradiation, the increase in charge density causes water to enter into the polymeric network and the collapsed polymer chains should become extended, thus leading to a large expansion ratio (FIG. 3C). Conversely, polymer chains with higher LCST values should be less coiled at room temperature and only exhibit minimal expansion when extended as a result of photoisomerization.

Figure 4:
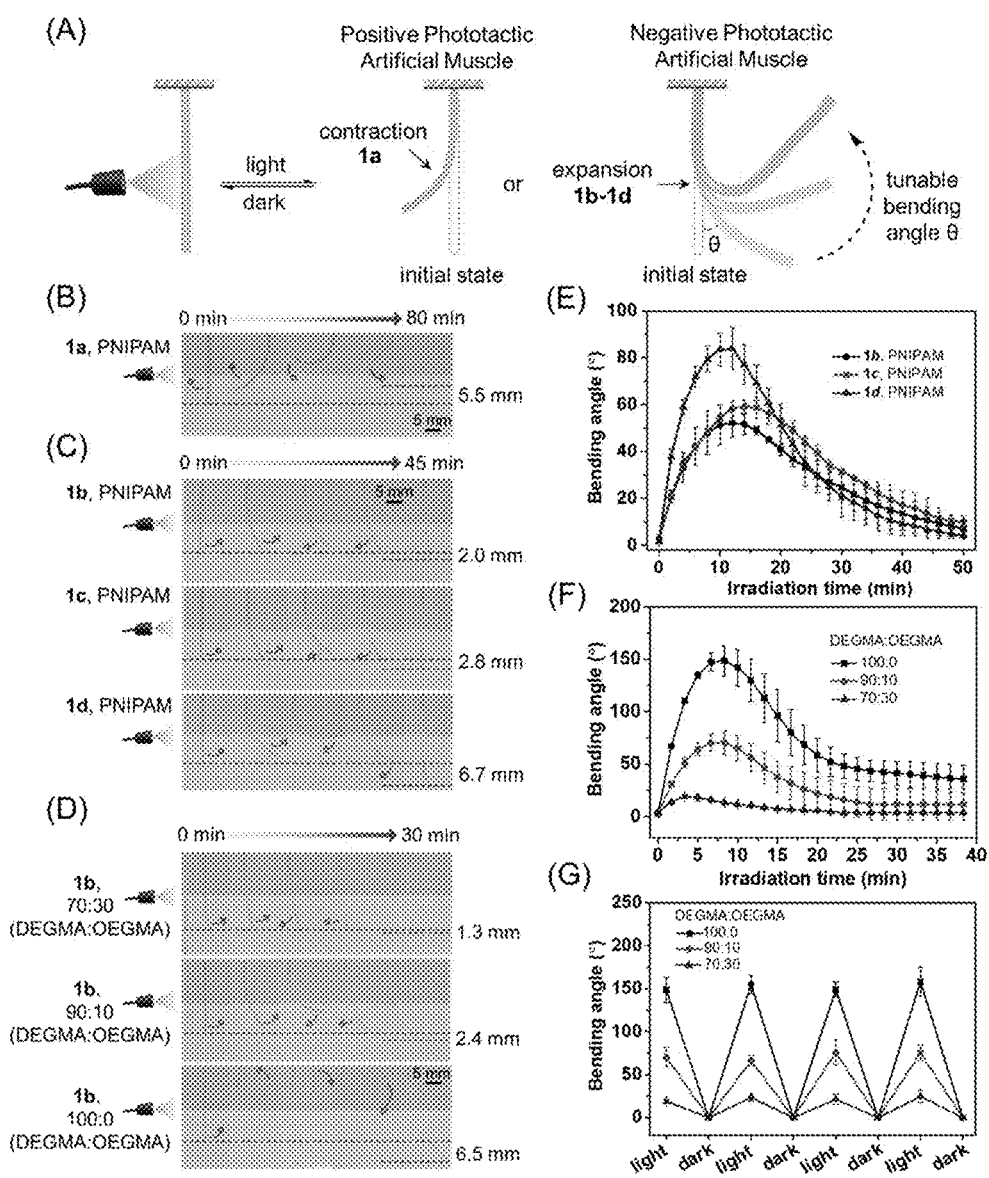
FIG. 4. (A) Schematic representation of light-activated artificial muscles mimicking positive (1a) or negative (1b-1d) phototaxis. (B) Photographs of bending hydrogels containing 1a and a PNIPAM network as a result of the well-known photocontraction in these systems (bending towards the light). The dashed lines represent the positions before (long) and after irradiation (short) and the numbers indicate the change of height after irradiation. (C) Photographs of bending hydrogels containing the sulfonated spiropyrans (1b-1d) and a PNIPAM backbone induced by photoexpansion (bending away from the light). (D) Photographs of bending hydrogels containing 1b and different poly (DEGMA$_x$-co-OEGMA$_y$) networks. The numbers on the left represent the relative molar ratio of DEGMA and OEGMA. (E) Plot of bending angles as a function of irradiation time in photoexpanding hydrogels containing different spiropyrans and PNIPAM backbones. (F) Plot of bending angles as a function of irradiation time for photoexpanding hydrogels containing 1b and poly(DEGMA$_x$-co-OEGMA$_y$) networks with different relative molar ratios of DEGMA and OEGMA. (G) Plot of changes in maximum bending angles over four light-dark cycles for three different artificial muscles containing 1b and poly(DEGMA$_x$-co-OEGMA$_y$) networks. The numbers represent the relative molar ratio of DEGMA and OEGMA. The light and dark periods take 40 min and 100 min, respectively.
Figure 5:
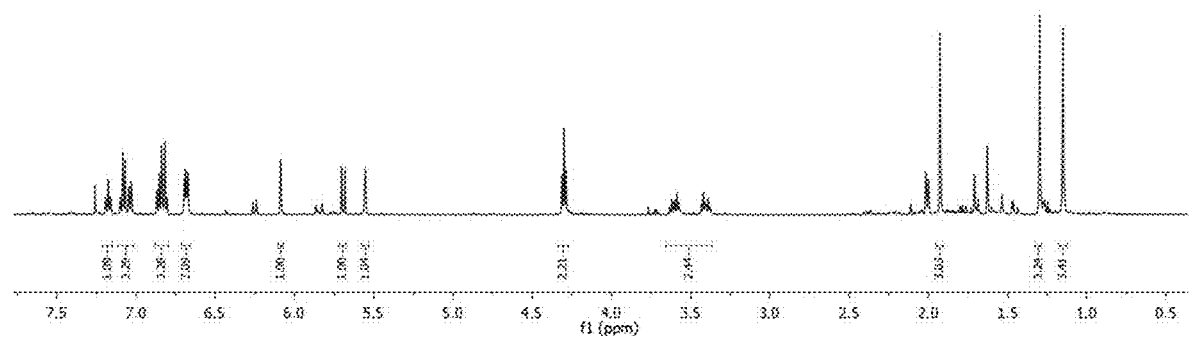
FIG. 5. $^1$H-NMR spectra of compound 1a in CDCl$_3$.
Figure 6:
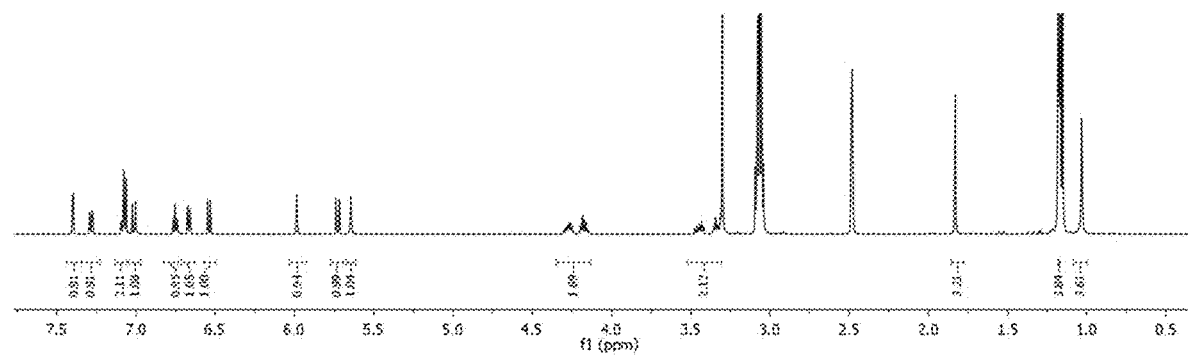
FIG. 6. $^1$H-NMR spectra of compound 1b in DMSO-d$_6$.
Figure 7:
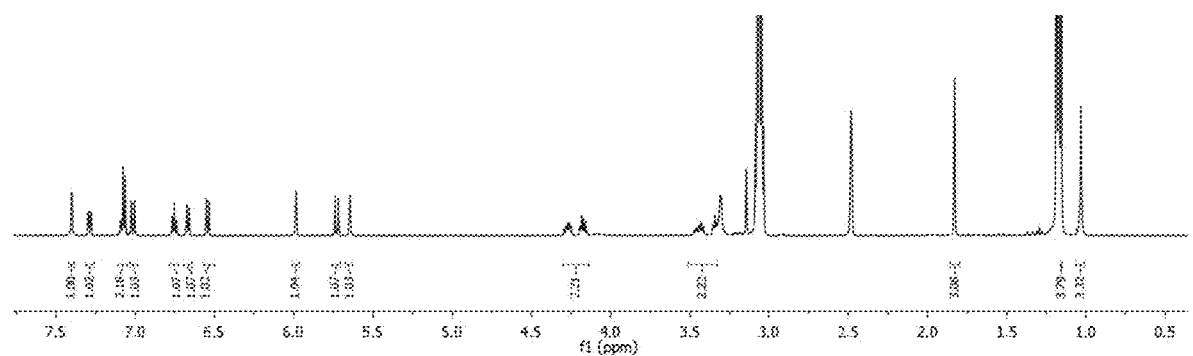
FIG. 7. $^1$H-NMR spectra of compound 1c in DMSO-d$_6$.
Figure 8:
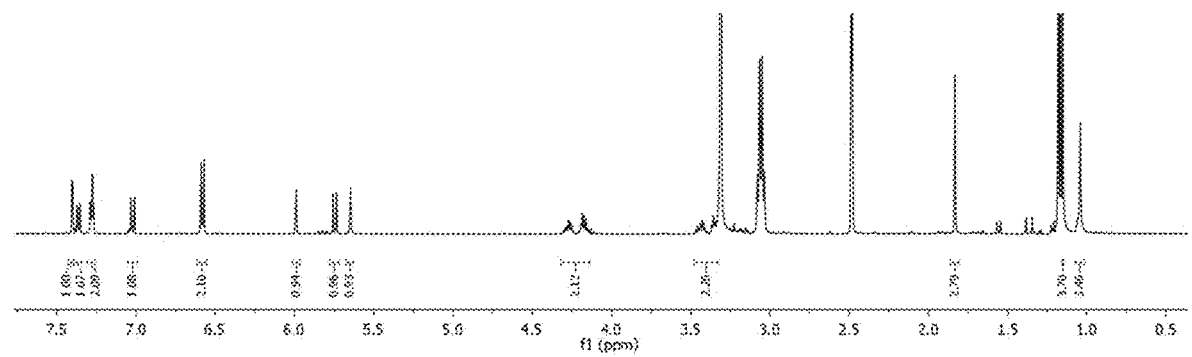
FIG. 8. $^1$H-NMR spectra of compound 1d in DMSO-d$_6$.
Figure 9:
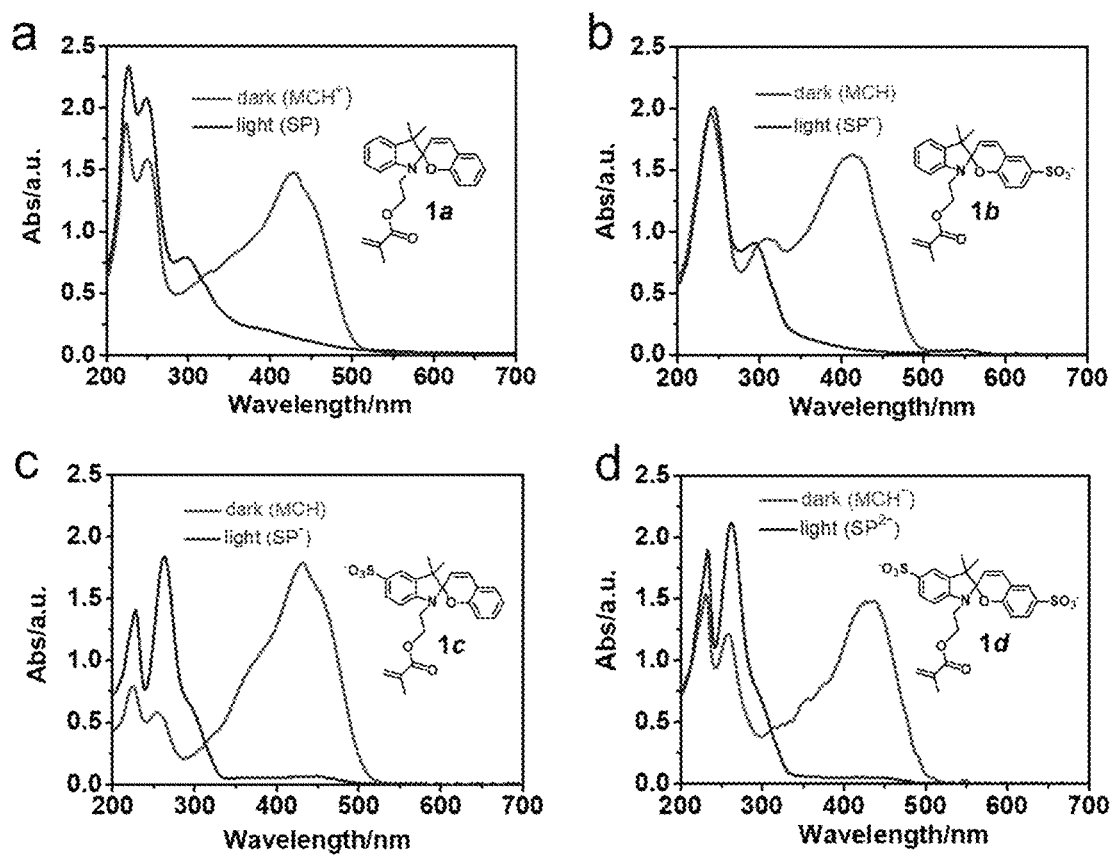
FIG. 9. UV-Vis spectroscopy of polymerizable water-soluble spiropyrans in methanol/water (4:1, v/v) containing 5 mM HCl for (a) 1a and water containing 5 mM HCl for (b) 1b, (c) 1c and (d) 1d before (red) and after (blue) irradiation with light.
Figure 10:
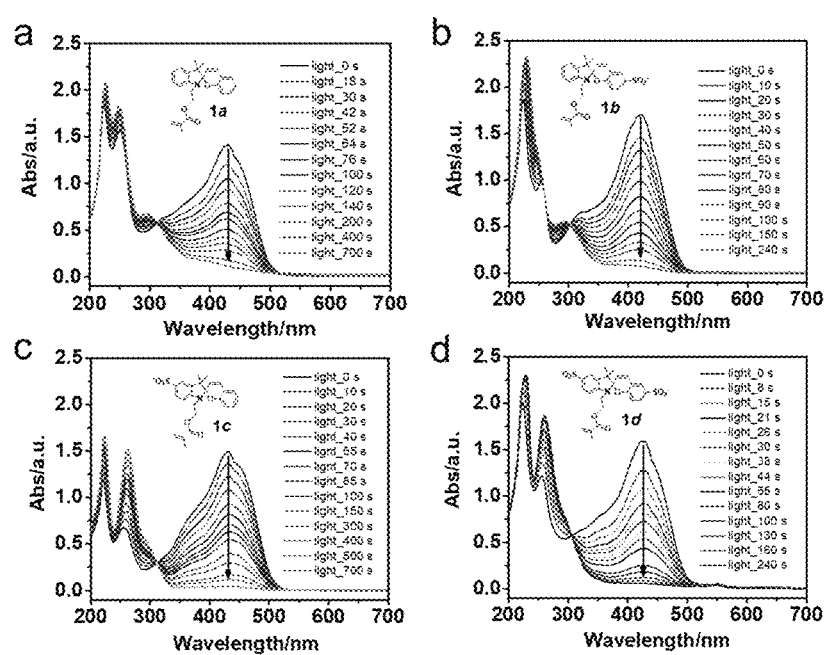
FIG. 10. Photoisomerization process under light irradiation. (a) 1a in a mixture solvent of methanol/water (4:1, v/v) containing 5 mM of HCl, and (b) 1b, (c) 1c and (d) 1d in water containing 5 mM of HCl.
Figure 11:
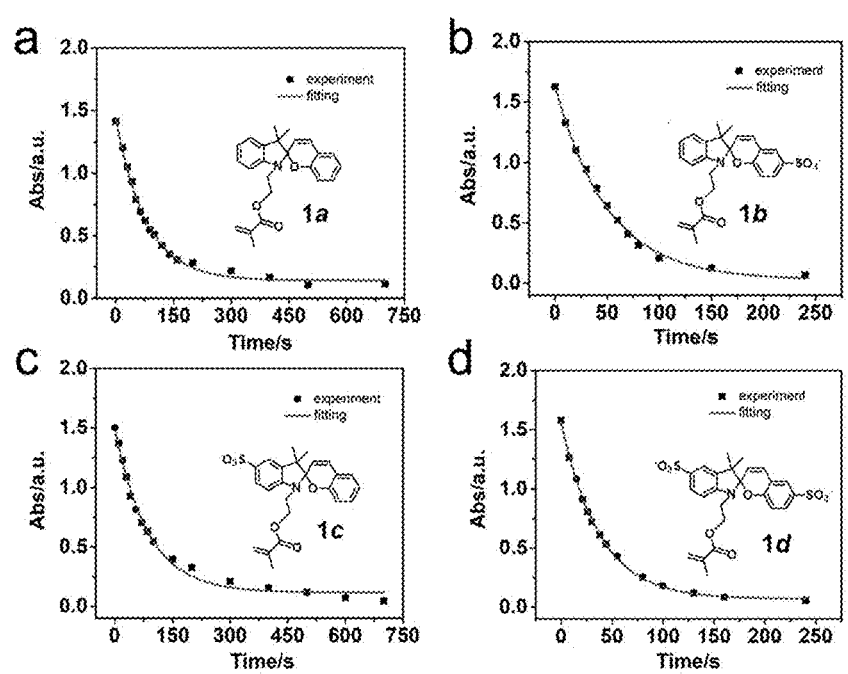
FIG. 11. Plot of the absorbance at 430 nm (MCH form) of 1a in a mixture solvent of methanol/water (4:1, v/v) containing 5 mM of HCl (a), and 1b (b), 1c (c) and 1d (d) in water containing 5 mM of HCl vs irradiation time (back squares) and fitting curve (red line) by ExpDec1 function in OriginPro software.
Figure 12:
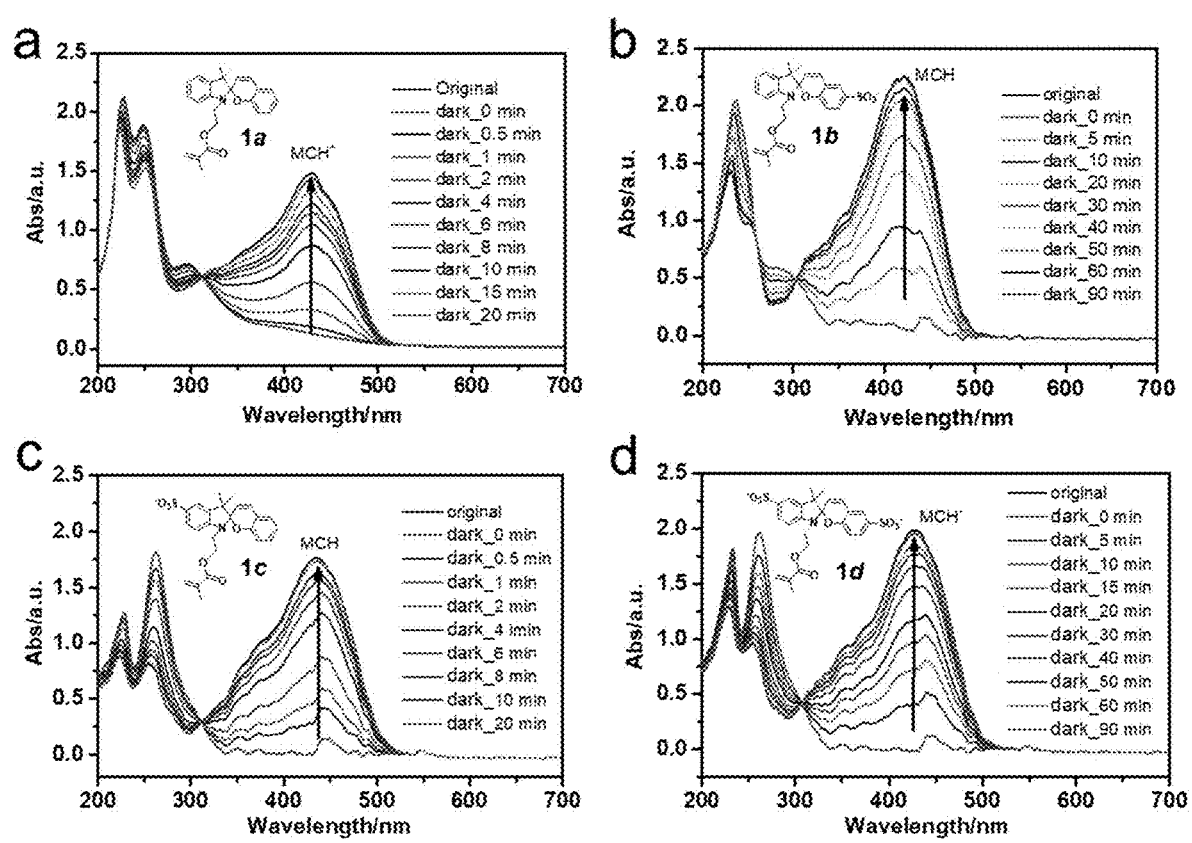
FIG. 12. Spontaneously ring-opening process in the dark of 1a (a) in a mixture solvent of methanol/water (4:1, v/v) containing 5 mM of HCl, and 1b (b), 1c (c) and 1d (d) in water containing 5 mM of HCl after light irradiation (0.35 mW/cm$^2$) for 30 min.
Figure 13:
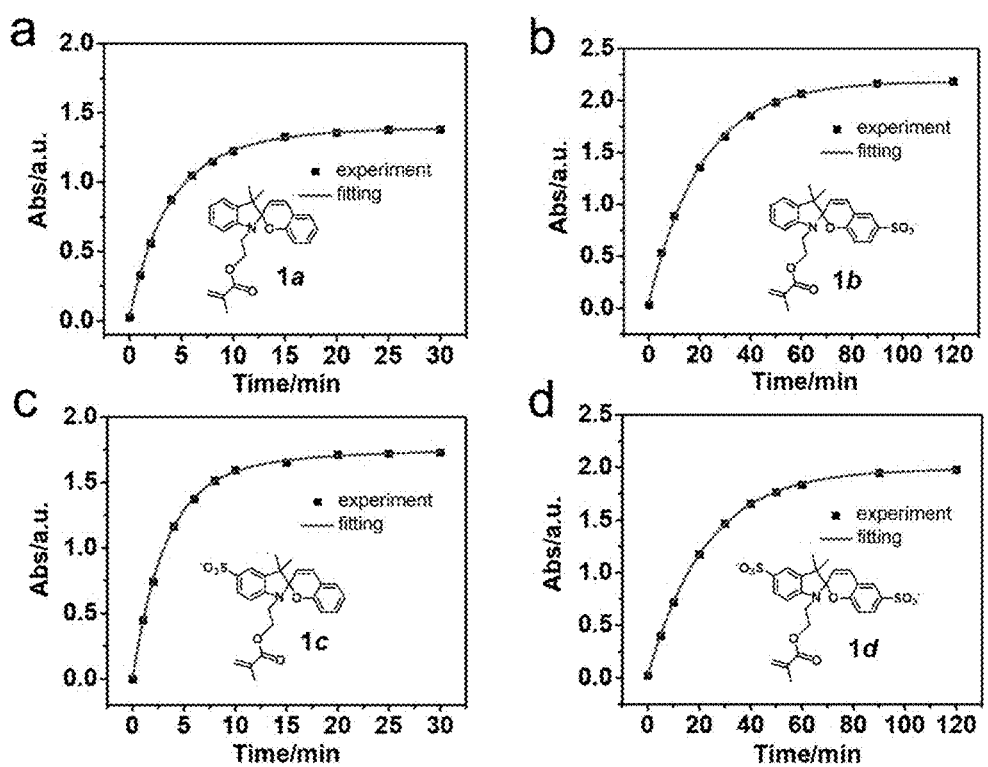
FIG. 13. Plotting of the absorbance at 430 nm (MCH form) in the dark of 1a in a mixture solvent of methanol/water (4:1, v/v) containing 5 mM of HCl (a), and 1b (b), 1c (c) and 1d (d) in water containing 5 mM of HCl vs time (back squares) and fitting curve (red line) by ExpDec2 function in OriginPro software.
Figure 14:
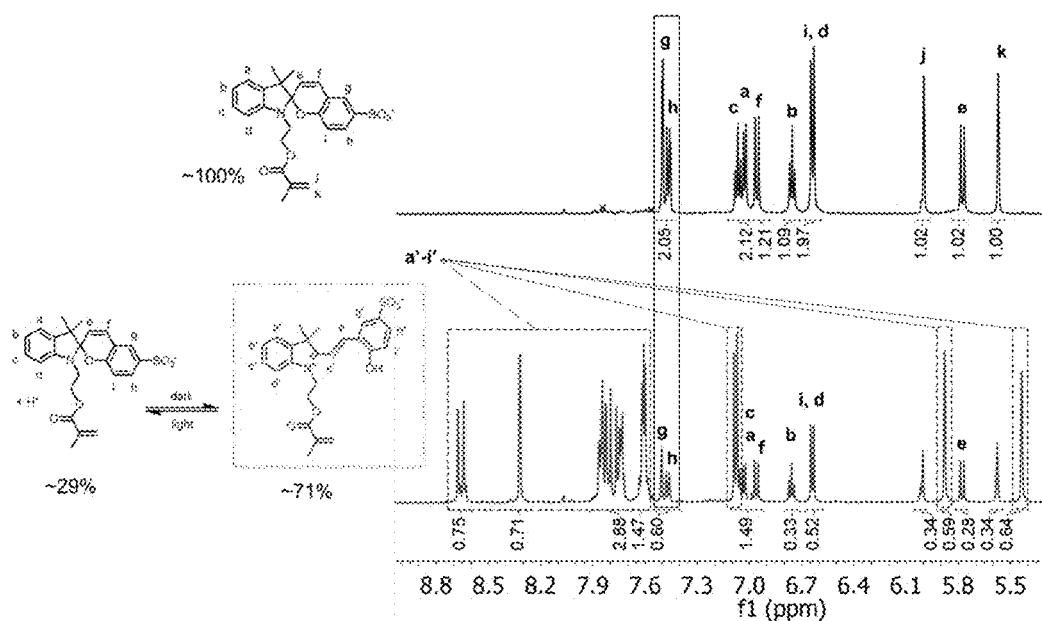
FIG. 14. $^1$H-NMR spectra of spiropyran molecule 1b (10 mg in 1,4-dioxane-d8/deuterium oxide (4:1, v/v), pH 2.5) was measured in the dark (bottom, red) and after light irradiation (top, blue). Dashed rectangle indicates the peaks of ring-opening form in the dark and the percentage of ring-opening isomer is determined by the integration reduction of proton g and h highlighted in rectangle.
Figure 15:
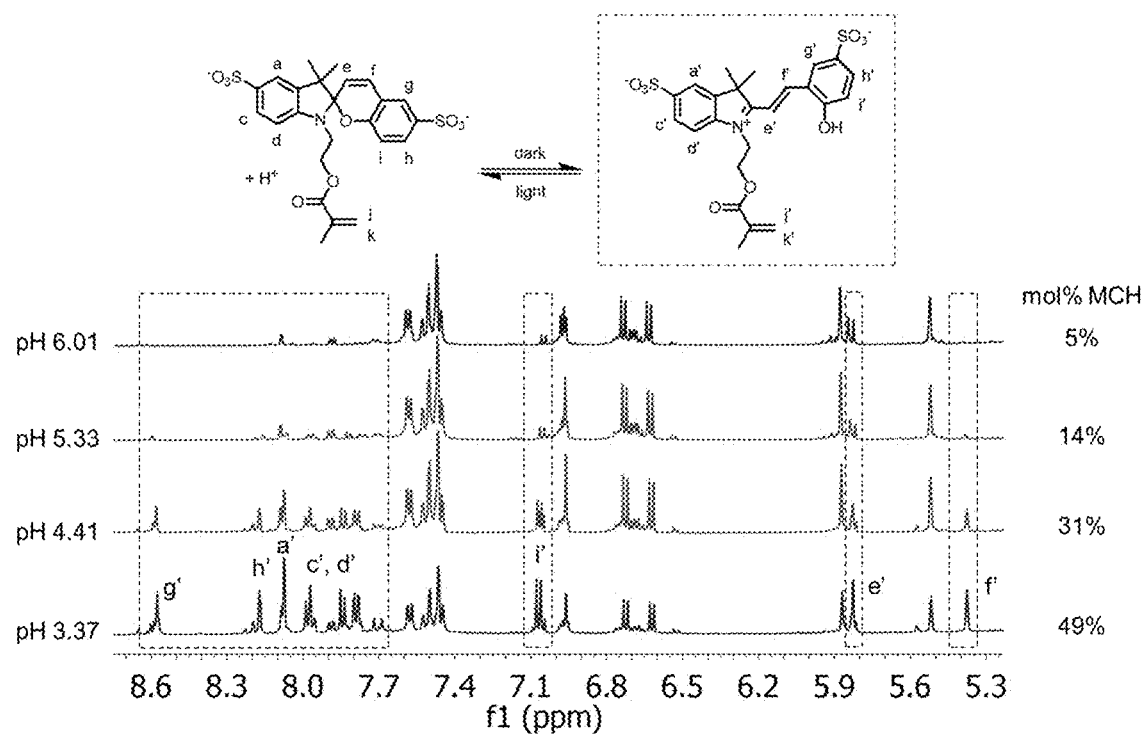
FIG. 15. $^{1}$H-NMR spectra of spiropyran molecule 1d (10 mg in 1,4-dioxane-d8/deuterium oxide (4:1, v/v), pH 2.5) was measured in the dark. Dashed rectangle indicates the peaks of ring-opened form in the dark and the percentage of ring-opened isomer.
Figure 16:
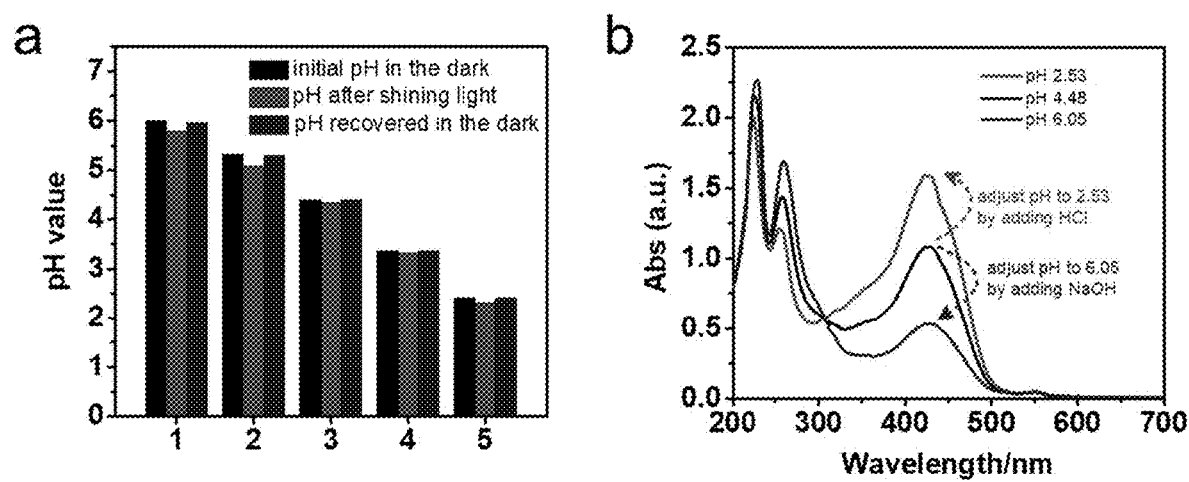
FIG. 16. (a) Measurement of pH values of an aqueous solution containing spiropyran molecule 1d (0.1 mM) after equilibrium in the dark (black), after shining light to fully drive the equilibrium to the ring-closed form (red) and recovered in the dark (blue). The initial pH values for samples 1-5 are 6.01, 5.33, 4.41, 3.37 and 2.5, respectively. (b) UV-Vis spectroscopy of an aqueous solution containing spiropyran molecule 1d (0.1 mM) at pH 4.48 after equilibrium in the dark (black), followed by adding HCl to adjust pH value to 2.53 (red) and adding NaOH to adjust pH value to 6.05 (blue).
Figure 17:
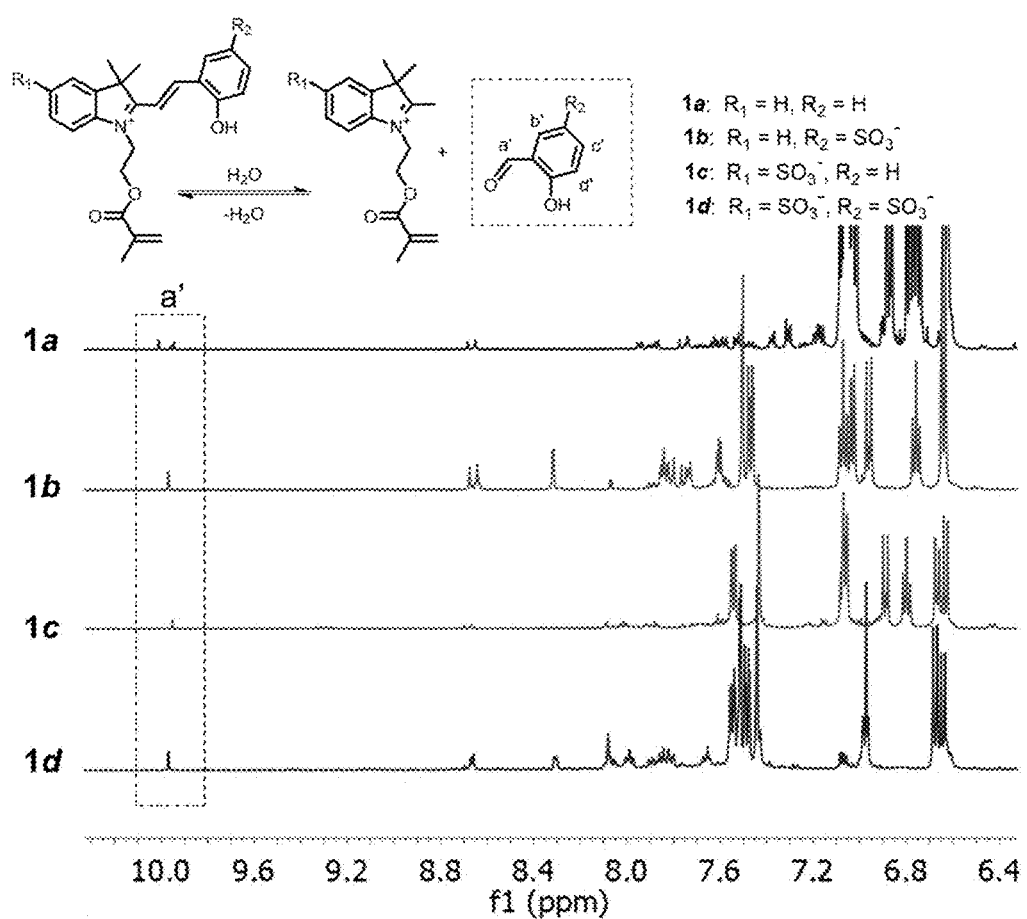
FIG. 17. $^{1}$H-NMR spectrum of compound 1a-1d in 1,4-dioxane-$d_8$/deuterium oxide (4:1, v/v, pH 2.5) at day 7. The dashed rectangle indicates the presence of the aldehyde proton from the hydrolyzed product.

Inspired by phototaxis in plants, it was sought to develop a series of phototactic artificial muscle networks (FIG. 4A). As shown in FIG. 4B, the rod-like gel containing 1a monomer bends towards the light source due to inhomogeneous contraction in the hydrogel (FIG. 3O), and this system is referred to as a positive phototactic (PP) artificial muscle. However, rod hydrogels synthesized with monomers 1b-1d bend away from the light source because the surface exposed to the light source expands first, creating an expansion gradient. This opposite bending behavior is defined here as a negative phototactic (NP) artificial muscle. Both PP and NP artificial muscles recover to their original unbent shape with longer irradiation time since the deformational gradient disappears in these systems as photons diffuse through the hydrogel. Most importantly, the bending angle of the NP artificial muscles is highly tunable using different spiropyran moieties (FIG. 4C) or by varying the LCST of the network's polymeric backbone (FIG. 4D). Keeping the same backbone, rod hydrogels containing 1d exhibit the largest bending angle and fastest bending speed relative to that of 1b and 1c since 1d has a higher charge density ($SP^{2-}$) after irradiation (FIG. 4E). For a given spiropyran molecule (1b), rod gels containing a polymeric backbone with a lower LCST exhibit larger bending angles and faster bending speeds because of the larger expansion of these gels (FIG. 4F). Reversible bending of these NP artificial muscles is highly reproducible through control of irradiation and pH conditions. FIG. 4G shows that the maximum bending angle is recovered after four bending-unbending cycles for three different types of NP artificial muscles.

Therefore, disclosed herein is a compound of formula (I):

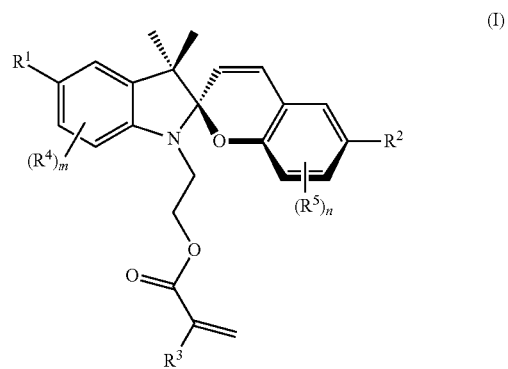

(I)

or a salt thereof, wherein.

R¹ and R² are each independently selected from hydrogen and —SO₃H, wherein at least one of R¹ and R² is —SO₃H;

R³ is selected from hydrogen and methyl;

m and n are each independently 0, 1, or 2; and

R⁴ and R⁵ are each independently selected from $C_1$-$C_3$ alkyl, $C_1$-$C_3$ alkoxy, halo, and nitro.

In some embodiments, R¹ is hydrogen and R² is —SO₃H. In some embodiments, R¹ is —SO₃H and R² is hydrogen. In some embodiments, R¹ and R² are both —SO₃H. In some embodiments, R³ is methyl. In some embodiments, R³ is hydrogen. In some embodiments, m is 0. In some embodiments, n is 0. In some embodiments, m is 0 and n is 0.

In some embodiments, the compound of formula (I) is selected from:

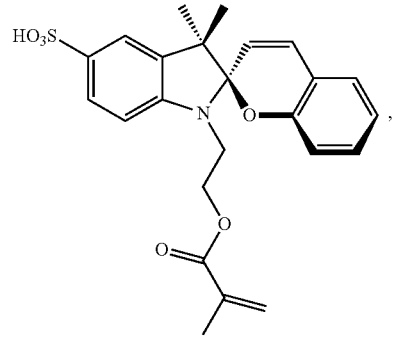
,

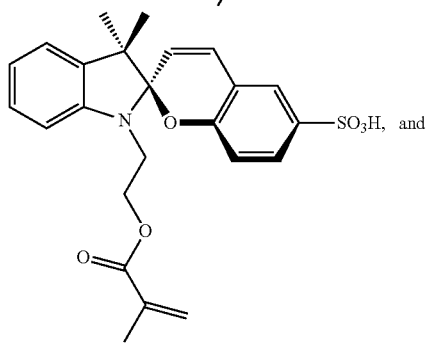
, and

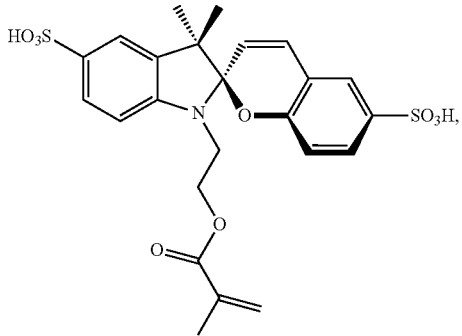
, or a salt of any thereof.

In some embodiments, the compound of formula (I) is in a salt form. For example, in some embodiments, one or both of the acidic —SO₃H groups is ionized and the compound further comprises one or more cations. In some embodiments, the compound of formula (I) is an alkali metal salt. In some embodiments, the compound of formula (I) is a sodium or potassium salt. In some embodiments, the compound of formula (I) is a potassium salt.

In some embodiments, the compound of formula (I) is selected from:

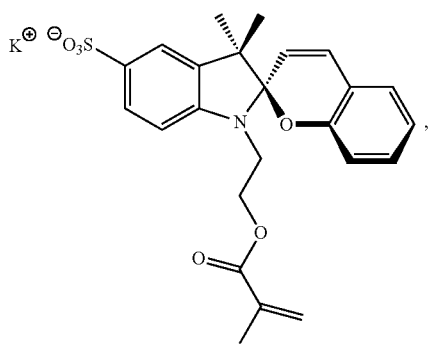
,

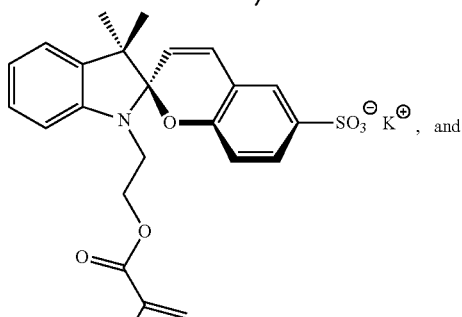
, and

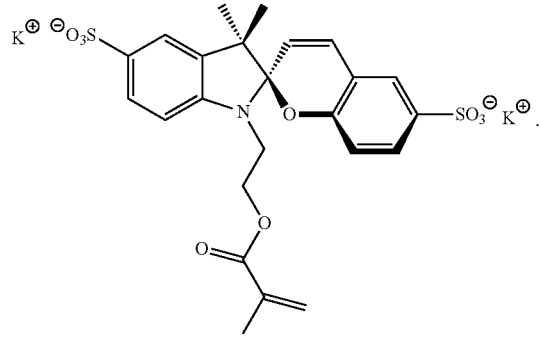
.

Also disclosed herein is a compound of formula (Ia):

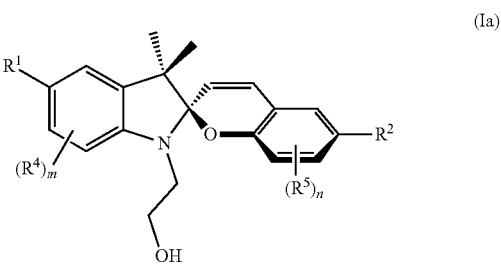

(Ia)

or a salt thereof, wherein:

R¹ and R² are each independently selected from hydrogen and —SO₃H, wherein at least one of R¹ and R² is —SO₃H;

m and n are each independently 0, 1, or 2; and

R⁴ and R⁵ are each independently selected from $C_1$-$C_3$ alkyl, $C_1$-$C_3$ alkoxy, halo, and nitro.

Compounds of formula (Ia) can be used to synthesize additional types of monomers containing the spiropyran moiety, via linkage to a polymerizable moiety via the hydroxyl group. In some embodiments, $R^1$ is hydrogen and $R^2$ is —SO$_3$H. In some embodiments, $R^1$ is —SO$_3$H and $R^2$ is hydrogen. In some embodiments, $R^1$ and $R^2$ are both —SO$_3$H. In some embodiments, m is 0 and n is 0.

In some embodiments, the compound of formula (Ia) is selected from:

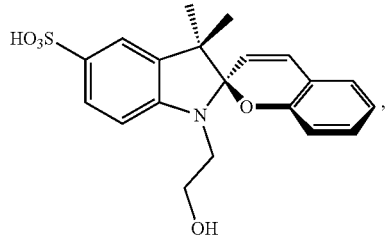

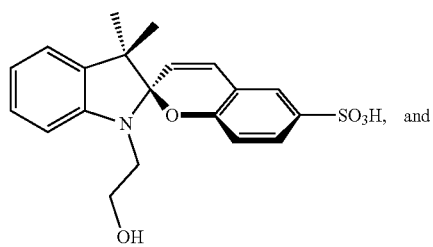

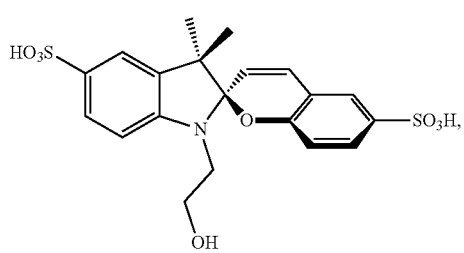

or a salt of any thereof.

In some embodiments, the compound of formula (Ia) is in a salt form. For example, in some embodiments, one or both of the acidic —SO$_3$H groups is ionized and the compound further comprises one or more cations. In some embodiments, the compound of formula (Ia) is an alkali metal salt. In some embodiments, the compound of formula (Ia) is a sodium or potassium salt. In some embodiments, the compound of formula (Ia) is a potassium salt.

In some embodiments, the compound of formula (Ia) is selected from:

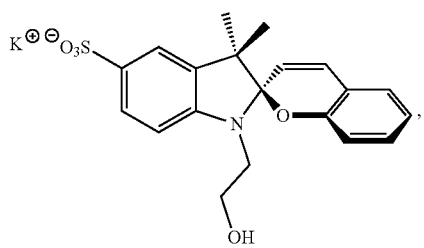

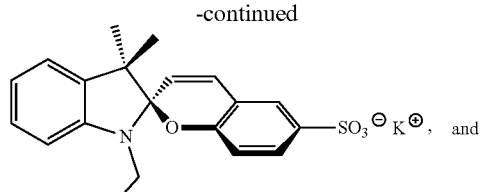

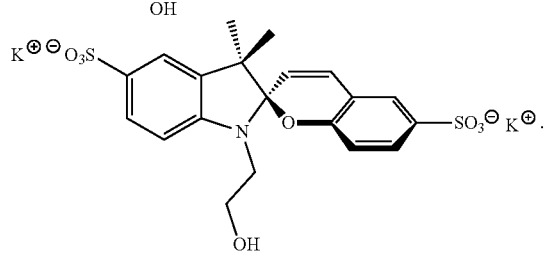

Also disclosed herein are polymers comprising a monomer unit of formula (II):

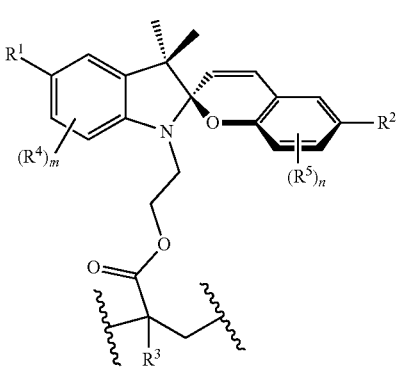

(II)

or a salt thereof, wherein:
R$^1$ and R$^2$ are each independently selected from hydrogen and —SO$_3$H, wherein at least one of R$^1$ and R$^2$ is —SO$_3$H;
R$^3$ is selected from hydrogen and methyl;
m and n are each independently 0, 1, or 2; and
R$^4$ and R$^5$ are each independently selected from C$_1$-C$_3$ alkyl, C$_1$-C$_3$ alkoxy, halo, and nitro,
wherein each

represents a point of attachment to the polymer chain.

In some embodiments, R$^1$ is hydrogen and R$^2$ is —SO$_3$H. In some embodiments, R$^1$ is —SO$_3$H and R$^2$ is hydrogen. In some embodiments, R$^1$ and R$^2$ are both —SO$_3$H. In some embodiments, R$^3$ is methyl. In some embodiments, R$^3$ is hydrogen. In some embodiments, m is 0. In some embodiments, n is 0.

In some embodiments, the monomer unit of formula (II) has a formula selected from:

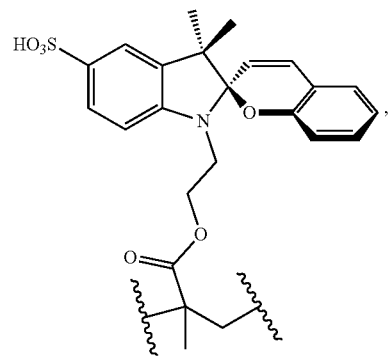

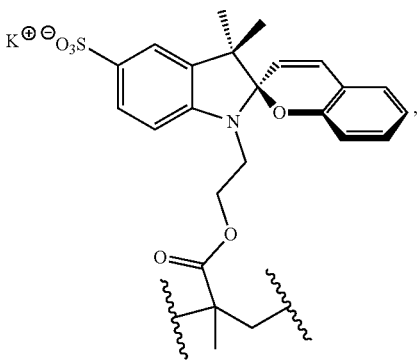

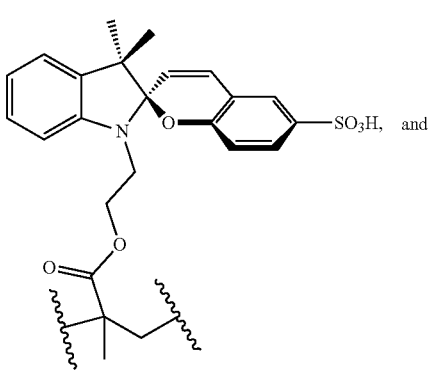

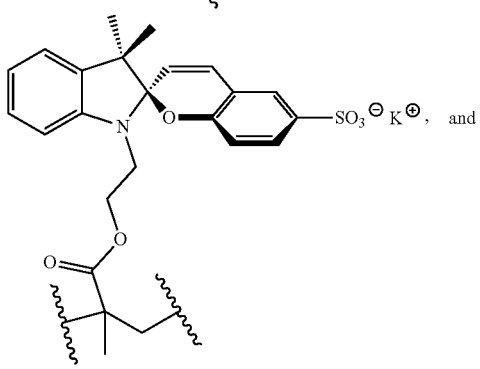

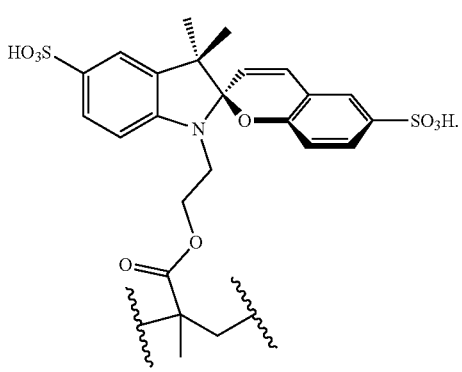

or a salt of any thereof.

In some embodiments, the monomer unit of formula (II) is in a salt form. For example, in some embodiments, one or both of the acidic —SO$_3$H groups is ionized and the monomer unit further comprises one or more cations. In some embodiments, the monomer unit of formula (II) is an alkali metal salt. In some embodiments, the monomer unit of formula (II) is a sodium or potassium salt. In some embodiments, the monomer unit of formula (II) is a potassium salt.

In some embodiments, the monomer unit of formula (II) has a formula selected from:

In some embodiments, the polymer further comprises one or more additional monomers selected from acrylamides and acrylates. In some embodiments, the polymer further comprises monomers selected from N-isopropylacrylamide, acrylamide, N,N-dimethylacrylamide, di(ethylene glycol) methyl ether methacrylate, oligo(ethylene glycol) methyl ether methacrylate, and any combination thereof. In some embodiments, the polymer further comprises N-isopropylacrylamide monomers. In some embodiments, the polymer further comprises a combination of di(ethylene glycol) methyl ether methacrylate and oligo(ethylene glycol) methyl ether methacrylate monomers. In some embodiments, the oligo(ethylene glycol) methyl ether methacrylate has 2, 3, 4, 5, 6, 7, 8, 9, or 10 ethylene glycol units. In some embodiments, the oligo(ethylene glycol) methyl ether methacrylate has 8 or 9 oligo(ethylene glycol) units.

In some embodiments, the polymer further comprises one or more crosslinking monomers. In some embodiments, the crosslinking monomer is a bis(acrylamide) compound, such as N,N'-methylenebis(acrylamide). In some embodiments, the crosslinking monomer is a di(meth)acrylate compound, such as ethylene glycol di(meth)acrylate, di(ethylene glycol) di(meth)acrylate, tri(ethylene glycol) di(meth)acrylate, or another oligo- or poly-ethylene glycol di(meth)acrylate. In some embodiments, the crosslinking monomer is ethylene glycol dimethacrylate or di(ethylene glycol) dimethacrylate.

EXPERIMENTAL

Example 1

Synthesis, Characterization of Polymerizable Water-Soluble Spiropyrans

Synthesis of Polymerizable Water-Soluble Spiropyrans

Polymerizable water-soluble spiropyrans were synthesized following the procedure described in Scheme S1 and purified using an automatic column machine (CombiFlash® EZ Prep). $^{1}$H and $^{13}$C nuclear magnetic resonance (NMR) spectra were taken on an Agilent DD 400 or 500 MHz with an HCN cryoprobe. Electrospray ionization mass spectrometry (ESI-MS) were carried out using an Agilent 6510 quadrupole time-of-flight (Q-TOF) instrument.

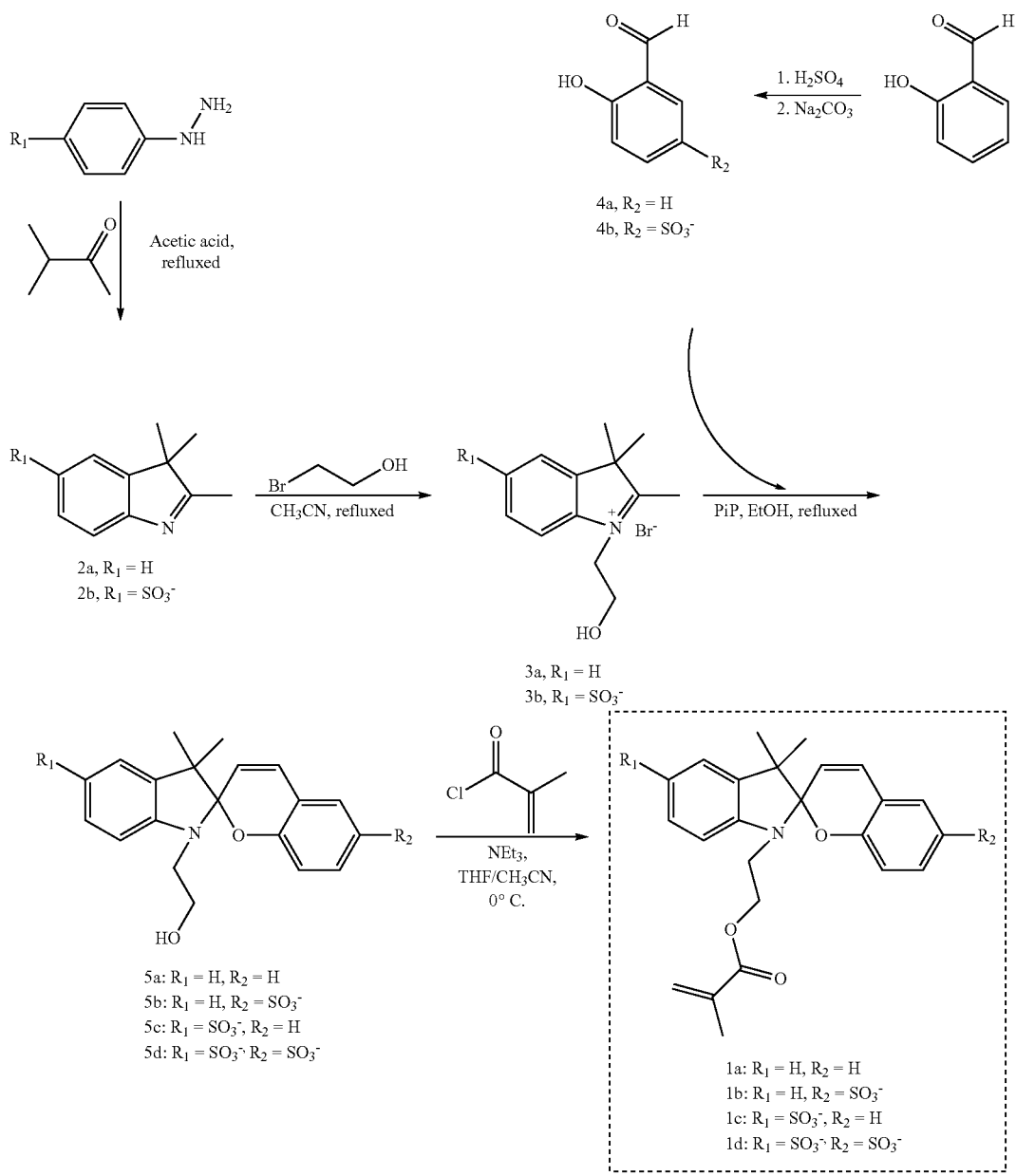

Scheme S1.
Synthetic route of polymerizable water-soluble spiropyrans 1a to 1d.

Synthesis of 2,3,3-trimethyl-3H-indolium-5-sulfonate (2b)

A mixture of 4-hydrazinylbenzenesulfonic acid hemihydrate (15 g, 76.1 mmol) and 3-methyl-2-butanone (25.2 ml, 235.9 mmol) in glacial acetic acid (50 mL) was heated to 110° C. and refluxed for 3 h. Afterwards the mixture was slowly cooled to room temperature and acetic acid was removed with rotary evaporation. The resultant dark red oil was dissolved in MeOH (75 ml), followed by addition of saturated solution of potassium hydroxide in 2-propanol (100 ml) to get yellow solid precipitation, which was filtered and totally dried under vacuum (10.7 g, 59%).

$^1$H-NMR (400 MHz, $d_6$-DMSO) δ (ppm): δ 7.62 (d, J=1.1 Hz, 1H), 7.54 (dd, J=6.3 Hz, 1.3 Hz 1H), 7.33 (d, J=6.4 Hz, 1H), 2.21 (s, 3H), 1.24 (s, 6H).

$^{13}$C-NMR (500 MHz, $d_6$-DMSO) δ (ppm): 189.36, 154.16, 145.65, 145.21, 125.73, 119.65, 118.64, 55.19, 22.97, 15.63.

MS-ESI (m/z): [M] calc. for $C_{11}H_{12}NO_3S^-$ 238.28; found [M+H]$^+$ 239.96.

Synthesis of 1-(2-hydroxyethyl)-2,3,3-trimethyl-3H-indolium bromide (3a)

2,3,3-trimethyl-3H-indolenine (4.0 g, 25.2 mmol) and 2-bromoethanol (6.8 g, 50.4 mmol) are dissolved in 60 mL acetonitrile, followed by stirring for 24 h at 85° C. under reflux. Afterwards the mixture is slowly cooled to room temperature and acetonitrile is removed under reduced pressure. The dark red oil is re-dissolved in 100 ml of dichloromethane, extracted three times with DI water (3×50 mL). The aqueous phase is collected, and carefully dealt with rotary evaporation at 60° C., followed by totally dried under high vacuum to get red dark salt (6.2 g, 87%).

$^1$H-NMR (400 MHz, d-DMSO) δ (ppm): 7.94-7.99 (m, J=2.6 Hz, 1H), 7.83-7.88 (m, J=2.6 Hz, 1H), 7.60-7.65 (m, J=2.4 Hz, 2H), 4.60 (t, J=4.1 Hz, 2H), 3.88 (t, J=4.1 Hz, 2H), 2.82 (s, 3H), 1.55 (s, 6H).

$^{13}$C-NMR (500 MHz, DMSO-$d_6$) δ (ppm): 198.19, 142.28, 141.64, 129.72, 129.24, 123.96, 116.15, 58.22, 54.75, 50.92, 22.53, 15.22.

MS-ESI (m/z): [M] calc. for $C_{13}H_{18}NOBr$ 284.20; found [M−Br]$^-$ 204.08.

Synthesis of 1-(2-hydroxyethyl)-2,3,3-trimethyl-3H-indolium-5-sulfonate (3b)

2,3,3-trimethyl-3H-indolenine-5-sulfonate (1b, 4.8 g, 20.0 mmol) and 2-bromoethanol (6.25 g, 50 mmol) are added in 100 mL acetonitrile, followed by stirring for 48 h at 85° C. under reflux. Afterwards the mixture is slowly cooled to room temperature and acetonitrile is removed under reduced pressure. The crude product is washed with Et$_2$O, filtered, and totally dried under vacuum to get pink solid (4.7 g, 83%).

$^1$H-NMR (400 MHz, d-DMSO) δ (ppm): 8.03 (d, J=0.9 Hz, 1H), 7.89 (d, J=6.7 Hz, 1H), 7.80 (dd, J=6.7 Hz, 1.1 Hz, 1H), 4.58 (t, J=4.0 Hz, 2H), 3.87 (t, J=4.0 Hz, 2H), 2.82 (s, 3H), 1.55 (s, 6H).

$^{13}$C-NMR (500 MHz, DMSO-$d_6$) δ (ppm): 200.98, 144.14, 142.72, 142.49, 126.85, 120.90, 115.93, 58.04, 55.10, 50.49, 21.70, 13.86.

MS-ESI (m/z): [M] calc. for $C_{13}H_{17}NO_4S$ 283.34; found [M−H]$^-$ 281.98.

Synthesis of sodium 5-sulfosalicylaldehyde (4b)

Sulfuric acid (95%, 100 ml) is slowly added to salicylaldehyde (10 ml, 11.5 g, 94.3 mmol) and stirred for 24 h at 35° C., followed by pouring slowly in a large volume of ice-water (500 g). Sodium carbonate (150 g) was added to neutralize the acid. The precipitate was collected, re-dissolved in the minimal amount of water and the pH was adjusted to 7 with 1 M NaOH solution. The resultant precipitate is collected and totally dried under vacuum to get a white powder (4.4 g, 23%).

$^1$H-NMR (400 MHz, $d_6$-DMSO) δ (ppm): δ 10.26 (s, 1H), 7.90 (d, J=1.7 Hz, 1H), 7.71 (dd, J=6.8 Hz, 1.7 Hz, 1H), 6.94 (d, J=6.8 Hz, 1H).

$^{13}$C-NMR (500 MHz, DMSO-$d_6$) δ (ppm): 193.82, 163.53, 142.32, 136.37, 128.81, 123.74, 119.25.

MS-ESI (m/z): [M] calc. for $C_7H_5O_5S^-$ 201.17; found [M−H]$^-$ 200.80.

General Synthesis of Spiropyran (5)

1 equiv. methylene base or indolium salt (3) and 1.2 equiv. aldehyde (4) are added to 50 ml of ethanol and heated to 60° C. with stirring, followed by addition of 1.2 equiv. piperidine. The solution is heated under reflux for 4 h. After cooling to room temperature, ethanol is removed by rotary evaporation and the crude product is purified by running silica column using DCM/MeOH as eluent to get the corresponding spiropyran.

2-(3',3'-dimethylspiro[chromene-2,2'-indolin]-1'-yl)ethan-1-ol (5a, 48%)

$^1$H-NMR (500 MHz, CDCl$_3$) δ (ppm): 7.17 (t, J=7.6 Hz, 1H), 7.06-7.13 (t, J=7.4 Hz, 2H), 7.01-7.06 (d, J=7.1 Hz, 1H), 6.80-6.90 (m, 3H), 6.61-6.73 (dd, J=8.0 Hz, 2H), 5.68 (d, J=9.9 Hz, 1H), 3.76 (t, J=5.1 Hz, 2H), 3.29-3.58 (m, J=5.1 Hz, 2H), 1.31 (s, 3H), 1.17 (s, 3H).

$^{13}$C-NMR (500 MHz, CDCl$_3$) δ (ppm): 154.81, 148.66, 139.19, 135.34, 131.21, 129.65, 127.33, 125.79, 121.01, 120.70, 119.43, 118.69, 114.94, 105.68, 104.44, 59.28, 52.17, 46.20, 26.09, 22.13.

MS-ESI (m/z): [M] calc. for $C_{20}H_{21}NO_2$ 307.39; [M+H]$^+$ found 308.13.

1'-(2-hydroxyethyl)-3',3'-dimethylspiro[chromene-2,2'-indoline]-6-sulfonate (5b, 54%)

$^1$H-NMR (500 MHz, DMSO-$d_6$) δ (ppm): 7.41 (d, J=2.1 Hz, 1H), 7.30 (dd, J=8.4 Hz, J=2.1 Hz, 1H), 7.04-7.11 (m, J=7.5 Hz, 2H), 7.01 (d, J=10.3 Hz, 1H), 6.73 (t, J=7.4 Hz, 1H), 6.53-6.60 (m, J=8.4 Hz, J=7.8 Hz, 2H), 5.78 (d, J=10.3 Hz, 1H), 3.40-3.55 (m, 2H), 3.07-3.28 (m, 2H), 1.19 (s, 3H), 1.07 (s, 3H).

$^{13}$C-NMR (500 MHz, DMSO-$d_6$) δ (ppm): 154.27, 147.67, 140.75, 136.29, 129.33, 127.82, 127.65, 124.90, 122.01, 120.62, 118.96, 117.89, 113.96, 106.62, 104.93, 59.66, 52.30, 46.12, 26.23, 22.07.

MS-ESI (m/z): [M] calc. for $C_{20}H_{20}NO_5S^-$ 386.44; [M−H]$^-$ found 386.08.

1'-(2-hydroxyethyl)-3',3'-dimethylspiro[chromene-2,2'-indoline]-5'-sulfonate (5c, 67%)

$^1$H-NMR (500 MHz, DMSO-$d_6$) δ (ppm): 7.37 (dd, J=8.0 Hz, 1.4 Hz, 1H), 7.26 (d, J=1.6 Hz, 1H), 7.14 (dd, J=7.5 Hz, 1.4 Hz, 1H), 7.04-7.09 (m, J=7.9 Hz, 1.4 Hz, 1H), 6.97 (d, J=10.3 Hz, 1H), 6.81 (t, J=7.4 Hz, 1H), 6.66 (d, J=8.1 Hz, 1H), 6.49 (d, J=8.1 Hz, 1H), 5.77 (d, J=10.3 Hz, 1H), 3.38-3.55 (m, 2H), 3.06-3.27 (m, 2H), 1.18 (s, 3H), 1.07 (s, 3H).

$^{13}$C-NMR (500 MHz, DMSO-d$_6$) δ (ppm): 154.01, 148.06, 139.26, 135.61, 130.21, 129.58, 127.42, 125.76, 120.71, 120.02, 119.82, 118.86, 114.90, 105.21, 104.84, 59.58, 52.14, 46.16, 26.05, 22.09.

MS-ESI (m/z): [M] calc. for $C_{20}H_{20}NO_5S^-$ 386.44; [M−H]$^-$ found 386.07.

1'-(2-hydroxyethyl)-3',3'-dimethylspiro[chromene-2, 2'-indoline]-5',6-disulfonate (5d, 58%)

$^1$H-NMR (500 MHz, DMSO-d$_6$) δ (ppm): 7.40 (d, J=2.0 Hz, 1H), 7.36 (dd, J=8.0 Hz, 1H), 7.25-7.31 (dd, J=8.4 Hz, 1.4 Hz, 1H), 7.01 (d, J=10.3 Hz, 1H), 6.58 (d, J=8.4 Hz, 1H), 6.49 (d, J=8.1 Hz, 1H), 5.78 (d, J=10.3 Hz, 1H), 3.38-3.55 (m, 2H), 3.06-3.27 (m, 2H), 1.18 (s, 3H), 1.07 (s, 3H).

$^{13}$C-NMR (500 MHz, DMSO-d$_6$) δ (ppm): 156.35, 150.17, 143.08, 141.55, 137.71, 131.72, 129.93, 128.04, 127.18, 122.50, 122.10, 120.01, 116.20, 107.42, 107.37, 61.78, 54.40, 48.33, 28.31, 22.35.

MS-ESI (m/z): [M] calc. for $C_{20}H_{19}NO_8S_2^{2-}$ 465.49; [M−2H]$^{2-}$ found 232.34.

Synthesis of Spiropyran-methacrylate (1)

1 equiv. spiropyran (5) is dissolved in 40 mL of tetrahydrofuran (THF) or acetonitrile, followed by addition of 2.5 equiv. NEt$_3$ in one portion. The reaction mixture is cooled to 0° C. followed by drop-wise addition of 2.5 equiv. methacryloyl chloride. After keeping the reaction at 0° C. for an additional hour, the mixture was stirred at room temperature for 3 h. The solvent is removed by rotary evaporation and the crude product is purified by column chromatography (DCM/hexanes for 1a, DCM/MeOH for 1b-1d) to get spiropyran-methacrylate.

2-(3',3'-dimethylspiro[chromene-2,2'-indolin]-1'-yl) ethyl methacrylate (1a, 52%)

$^1$H-NMR (500 MHz, CDCl$_3$) δ (ppm): 7.18 (t, J=7.6 Hz, 1H), 7.06-7.11 (m, J=7.5 Hz, 2H), 7.02-7.06 (d, J=7.5 Hz, 1H), 6.80-6.88 (m, 3H), 6.66-6.70 (m, 2H), 6.09 (s, 1H), 5.67-5.71 (d, J=10.3 Hz, 1H), 5.55 (s, 1H), 5.98 (s, 1H), 4.27-4.33 (t, J=6.4 Hz, 2H), 3.37-3.64 (m, 2H), 1.93 (s, 3H), 1.30 (s, 3H), 1.15 (s, 3H).

$^{13}$C-NMR (500 MHz, CDCl$_3$) δ (ppm): 167.31, 154.11, 147.23, 136.38, 136.20, 129.82, 129.48, 127.57, 126.79, 125.73, 121.74, 120.21, 119.54, 119.25, 118.49, 115.09, 106.47, 104.47, 63.02, 52.23, 42.43, 25.86, 20.09, 18.40.

MS-ESI (m/z): [M] calc. for $C_{24}H_{25}NO_3$ 375.47; [M+H]$^+$ found 376.20.

1'-(2-(methacryloyloxy) ethyl)-3',3'-dimethylspiro [chromene-2,2'-indoline]-6-sulfonate (1b, 41%)

$^1$H-NMR (500 MHz, DMSO-d$_6$) δ (ppm): 7.40 (d, J=2.0 Hz, 1H), 7.27-7.31 (d, J=8.3 Hz, 1H), 7.05-7.10 (m, J=7.4 Hz, 2H), 7.00-7.04 (d, J=10.3 Hz, 1H), 6.73-6.78 (t, J=7.4 Hz, 1H), 6.65-6.68 (d, J=7.8 Hz, 1H), 6.53-6.56 (d, J=8.4 Hz, 1H), 5.98 (s, 1H), 5.71-5.75 (d, J=10.3 Hz, 1H), 5.65 (t, J=1.4 Hz, 1H), 4.14-4.31 (m, 2H), 3.31-3.48 (m, 2H), 1.84 (s, 3H), 1.16 (s, 3H), 1.03 (s, 3H).

$^{13}$C-NMR (500 MHz, DMSO-d$_6$) δ (ppm): 166.92, 154.08, 147.24, 141.17, 136.30, 136.17, 129.70, 127.83, 127.73, 126.44, 124.95, 122.12, 120.02, 119.41, 117.77, 113.96, 106.78, 104.87, 62.94, 52.27, 42.39, 26.03, 20.08, 18.49.

MS-ESI (m/z): [M] calc. for $C_{24}H_{24}NO_6S^-$ 454.52; [M−H]$^-$ found 454.15.

1'-(2-(methacryloyloxy) ethyl)-3,3'-dimethylspiro [chromene-2,2'-indoline]-5'-sulfonate (1c, 62%)

$^1$H-NMR (500 MHz, DMSO-d$_6$) δ (ppm): 7.40 (d, J=2.0 Hz, 1H), 7.29 (dd, J=8.3 Hz, 2.0 Hz, 1H), 7.06-7.11 (m, J=7.4 Hz, 2H), 6.98-7.02 (d, J=10.3 Hz, 1H), 6.80-6.87 (t, J=7.4 Hz, 1H), 6.65-6.69 (d, J=7.7 Hz, 1H), 6.58-6.61 (d, J=8.4 Hz, 1H), 6.00 (s, 1H), 5.73-5.77 (d, J=10.3 Hz, 1H), 5.67 (t, J=1.4 Hz, 1H), 4.16-4.32 (m, 2H), 3.35-3.51 (m, 2H), 1.84 (s, 3H), 1.17 (s, 3H), 1.05 (s, 3H).

$^{13}$C-NMR (500 MHz, DMSO-d$_6$) δ (ppm): 166.89, 153.99, 147.57, 140.03, 136.16, 135.55, 130.34, 129.88, 127.49, 124.46, 125.66, 120.85, 119.92, 119.53, 118.77, 114.95, 105.36, 104.85, 63.03, 52.12, 42.49, 25.85, 20.02, 18.49.

MS-ESI (m/z): [M] calc. for $C_{24}H_{24}NO_6S^-$ 454.52; [M−H]$^-$ found 454.13.

1'-(2-(methacryloyloxy) ethyl)-3',3'-dimethylspiro [chromene-2,2'-indoline]-5',6-disulfonate (1d, 49%)

$^1$H-NMR (500 MHz, DMSO-d$_6$) δ (ppm): 7.40 (d, J=2.1 Hz, 1H), 7.35-7.38 (dd, J=8.0 Hz, 1H), 7.26-7.30 (m, J=1.6 Hz, 2H), 7.01-7.04 (d, J=10.3 Hz, 1H), 6.56-6.60 (m, J=8.2 Hz, 2H), 5.99 (s, 1H), 5.73-5.76 (d, J=10.3 Hz, 1H), 5.65 (t, J=1.6 Hz, 1H), 4.12-4.30 (m, 2H), 3.34-3.48 (m, 2H), 1.84 (s, 3H), 1.15 (s, 3H), 1.04 (s, 3H).

$^{13}$C-NMR (500 MHz, DMSO-d$_6$) δ (ppm): 174.72, 167.32, 154.43, 147.95, 141.69, 140.42, 136.57, 135.92, 130.27, 128.17, 126.92, 126.12, 125.41, 120.35, 120.14, 118.12, 114.42, 105.55, 63.43, 52.54, 42.88, 26.32, 20.38, 18.93.

MS-ESI (m/z): [M] calc. for $C_{24}H_{23}NO_9S_2^{2-}$ 535.58; [M−2H]$^{2-}$ found 266.41.

UV-Vis Spectra of Polymerizable Water-Soluble Spiropyrans.

1a was dissolved in a mixture solvent of methanol/water (4:1, v/v) containing 5 mM of HCl and 1b-1d were dissolved in Milli-Q water containing 5 mM of HCl to get a final concentration of 0.1 mM. The samples were incubated in the dark overnight before measurement. Absorbance spectroscopy of this solution was collected using a 1 mm path length, demountable quartz cuvette on a Shimadzu UV-1800 UV spectrophotometer. An intensity (0.35 mW/cm$^2$) of blue LED (450 nm) was applied to this solution for 30 min to isomerize the ring-opened protonated merocyanine form to the ring-closed spiropyran form, followed by recollecting the absorbance spectroscopy.

Photoisomerization Kinetics

After equilibration in acidic water (5 mM HCl) overnight in the dark, 0.1 mM of samples (1b-1d) were irradiated with blue light (450 nm, 0.35 mW/cm$^2$) during which the absorbance of the solution was collected by UV-Vis spectrophotometer until the absorbance of MCH form at 430 nm becomes zero. 1a were treated with the same method but in a mixture solvent of methanol/water (4:1, v/v) containing 5 mM of HCl. The photoisomerization kinetics was obtained by plotting the absorbance of merocyanine form at 430 nm vs time and fitted using by an ExpDec1 function in OriginPro software, giving a ring-opening rate of 0.013 s$^{-1}$ (1a), 0.020 s$^{-1}$ (1b), 0.012 s$^{-1}$ (1c) and 0.027 s$^{-1}$ (1d), respectively.

Spontaneous Ring-Opening Kinetics in the Dark

In order to obtain the spontaneous ring-opening rate in the dark after irradiation with light, 0.1 mM of 1a in a mixture solvent of methanol/water (4:1, v/v) containing 5 mM of HCl was collected the absorbance by UV-Vis spectrophotometer every 30 s until the absorbance did not increase. 1b-1d (0.1 mM) were measured using the same method in water containing 5 mM of HCl. The ring-opening rate was obtained by plotting the absorbance of merocyanine form at 430 nm vs time and fitted using by an ExpDec2 function in OriginPro software, giving a ring-opening rate of 0.371 min$^{-1}$ (1a), 0.048 min$^{-1}$ (1b), 0.330 min$^{-1}$ (1c) and 0.044 min$^{-1}$ (1d), respectively.

Percentage of Ring-Open Isomer after Thermal Equilibration in the Dark

Compounds 1a-1d were dissolved in a 4:1 (v/v) mixture of 1,4-dioxane-d$_8$/deuterium oxide to obtain a concentration of 10 mg/ml, followed by adding deuterium chloride in deuterium oxide to adjust the pH to a value of 2.5. These samples were left in the dark overnight to achieve the thermal equilibration before taking $^1$H nuclear magnetic resonance (NMR) spectra on an Agilent DD 500 MHz with an HCN cryoprobe. These samples were irradiated with white light for 1 h to fully drive the equilibrium to the ring-closed form and the $^1$H NMR spectra were immediately acquired using the same instrument. Based on the lower integration values of protons from ring-closed isomer, we calculated the percentage of equilibrium ring-open isomer in the dark for 1a, 1b, 1c and 1d to be 68%, 71%, 73% and 71%, respectively. One representative example of the integration for compound 1b is given in FIG. S6.

To determine the percentage of ring-opened isomer under different pH values, we collected $^1$H-NMR spectra of spiropyran molecule 1d in the dark following the same protocol described above. Using the same calculation strategy based on the integration reduction of protons for the ring-closed form, we determined that the percentage of ring-opened isomer was 49% at pH 3.37, 31% at pH 4.41, 14% at pH 5.33, and 5% at pH 6.01.

Quantum Yield Calculation

Quantum yields (of ring closure at pH 2.5 were calculated according a previous method by the equation:

$$\Phi = \frac{\text{moles of photoproduct}}{(\text{photon flux incident on sample})(\% \text{ light absorbed by } MCH)}$$

where the moles of created photoproduct (ring-closed form) was determined by concentration×volume×percentage of ring-opened isomer=0.1 mM×1 ml×71%=7.1×10$^{-7}$ mol. The photon flux was obtained by converting light intensity used (0.35 mW/cm$^2$, 450 nm), giving a value of 1.317×10$^{-5}$ mole/(m$^2$·s). Percent of light absorbed by MCH was determined from initial sample MCH absorbance giving a percentage of 48%.

$$\Phi = \frac{7.1 \times 10^{-7} \text{ mole}}{1.317 \times 10^{-5} \text{ mole}/(m^2 \cdot s) \cdot 48\%} = 0.11 \text{ m}^2 \cdot \text{s}^1$$

Quantum yields of ring closure at pH 2.5 of compound 1a, 1c and 1d were calculated following the same equation above, giving a value of 0.10 m$^2$·s$^1$, 0.12 m$^2$·s$^1$ and 0.11 m$^2$·s$^1$, respectively.

Hydrolysis

The hydrolysis was detected and quantified by measuring $^1$H-NMR spectrum of the hydrolyzed product salicylaldehyde (1a, 1c) or salicylaldehyde-5-sulfonate (1b, 1d) during day 1 and day 7. We did not observe obvious hydrolysis during the first day, but we did see a 4% hydrolysis for compound 1a and 1c, 6% hydrolysis for compound 1b and 1d by day 7 based on the integration of the proton from the aldehyde group of the hydrolyzed product.

Example 2

Hydrogel Preparation and Characterization

Hydrogel Preparation

To prepare the PNIPAM hydrogel containing different polymerizable water-soluble spiropyrans (1b-1d), N-isopropylacrylamide (NIPAAm, 100 mg, 885.0 μmol), N,N-methylenebisacrylamide (MBAAm, 6.8 mg, 44.2 μmol), polymerizable spiropyrans (17.7 μmol) were dissolved in MilliQ water (1 mL). Initiator of 10 wt % of ammonium persulfate initiator (APS, 50 μL) and tetramethylethylenediamine (TEMED, 3.7 μL) were then added to the solution in order to carry out the free-radical polymerization at 4° C. for 2 h. The hydrogel was incubated in water containing 5 mM of HCl overnight before the photoactuation study. The PNIPAM hydrogel containing hydrophobic 1a was prepared following the same protocol described above using a dioxane/water (4:1, v/v) mixture solvent and the resultant gel was soaked in a large volume of MeOH then water overnight to obtain the final hydrogel.

Poly(DEGMA$_x$-co-OEGMA$_y$) hydrogels containing water-soluble spiropyrans 1b-1d were prepared following the same protocol described above, keeping a fixed molar ratio of total DEGMA/OEGMA monomer/MBAAm crosslinker/spiropyran at 100/5/2. The ratio between di(ethylene glycol) methyl ether methacrylate (DEGMA, M$_w$ 188, density 1.02 g/ml) and oligo(ethylene glycol) methyl ether methacrylate (OEGMA, M$_n$ 500, density 1.08 g/ml) was varied in order to tune the LCST of resultant polymers. The monomers were dissolved in 1 mL of water followed by addition of 50 μL of APS (10 wt %) and 3.7 μL of TEMED to initiate the polymerization.

TABLE 1

Formulations for preparation of poly(DEGMA$_x$-co-OEGMA$_y$) hydrogels using 1b.

| Monomers | Gel b-1 (0%) | Gel b-2 (5%) | Gel b-3 (10%) | Gel b-4 (20%) | Gel b-5 (30%) | Gel b-6 (100%) |
|---|---|---|---|---|---|---|
| OEGMA | 0 | 20.5 μL | 41 μL | 82 μL | 123 μL | 410 μL |
| DEGMA | 163 μL | 155 μL | 146.8 μL | 130.5 μL | 114.2 μL | 0 |
| MBAAm | 6.8 mg | 6.8 mg | 6.8 mg | 6.8 mg | 6.8 mg | 6.8 mg |

TABLE 1-continued

Formulations for preparation of poly(DEGMA$_x$-co-OEGMA$_y$) hydrogels using 1b.

| Monomers | Gel b-1 (0%) | Gel b-2 (5%) | Gel b-3 (10%) | Gel b-4 (20%) | Gel b-5 (30%) | Gel b-6 (100%) |
|---|---|---|---|---|---|---|
| 1b | 8 mg | 8 mg | 8 mg | 8 mg | 8 mg | 8 mg |
| H$_2$O | 837 μL | 824.5 μL | 812.2 μL | 787.5 μL | 762.8 μL | 590 μL | x % indicates the molar percentage of OEGMA in relative the total monomers by keeping the ratio of total monomer/crosslinker/1b at 100/5/2; Total mole is 885.0 μmol in 1 ml of water.

To prepare hydrogels with desired shapes, different molds were used. For example, hydrogel films with 0.5 mm thickness were polymerized in a glass mold with a 0.5 mm thick plastic spacer. Hydrogel dishes with different diameters were punched using a metal puncher with a specific shape and size. Hydrogel rods prepared in a glass capillary with a diameter of 1 mm and removed from the capillary by air pressure.

Mechanical Property Characterized by Rheology

Mechanical properties of hydrogels were measured using an Anton Paar Modular Compact Rheometer (MCR 302). The hydrogel films (0.5 mm thick) were punched into a dish shape with a diameter of 8 mm and the rheology experiments were performed in 8 mm parallel-plate geometry with a gap size of 0.4 mm at a fixed frequency of 1 Hz and strain of 1% at 25° C. Hydrogels made of 1a were found mechanically weaker relative to hydrogels containing 1b-1d moieties probably due to the presence of dioxane during the preparation which affected the kinetics of polymerization.

Photoactuation in Acidic Water (5 mM of HCl)

The prepared hydrogel films (0.5 mm thick) made of spiropyran moieties (1a-1d) were soaked in water containing 5 mM of HCl in the dark overnight to protonate the ring-opened merocyanine form, followed by punching into a dish shape with a diameter of 10 mm using a metal puncher. Photoactuation were carried out by irradiating bottom blue light (450 nm, 0.35 mW/cm$^2$) on these gel dishes during which photographs were taken from top. The photoinduced volume contraction were calculated by measuring the size change after light irradiation.

We also studied the photoactuation in neutral water (MilliQ water) and basic water (pH 9.0 by adding NaOH) using hydrogel samples containing 1b moiety. After equilibration in neutral or basic water, the gel samples were punched into dish shapes (10 mm in diameter, 0.5 mm thick) and the photoactuation study was carried out following the same protocol as the acidic water. We found that the net volume ratio in neutral water was smaller relative to that in acidic water, because the merocyanine form is not fully protonated in DI water as conformed by UV-Vis spectra in Figure S12b. The unprotonated MC-form has equal net charge with photoinduced SP-form, therefore do not contribute to expansion. This is also verified by experiments carried out in basic water, where we did not observe any expansion behaviors as merocyanine is fully deprotonated in basic water. These results indicated that the protonation of merocyanine form is critical for the change of net charge upon irradiation, which is responsible for the photoexpansion.

Example 3

Coarse-Grained Model and Simulations

We used the bonded parameters from our previous work[2] and MARTINI bead types[3] to model spiropyran (SP and MCH) and NIPAM monomers (see Figure S9 for bead types). In order to observe the effect of using different functional groups (R$_1$, R$_2$), we performed molecular dynamics (MD) simulations using the spiropyran derivatives 1a, 1b, and 1d in Scheme S1. Each polymer chain consisted of 2 spiropyrans (SP or MCH depending on light conditions), 100 NIPAM monomers and 5 cross-linkers. The covalent cross-linker (MBAAm) was modeled as a P3 type bead using the "intermolecular_interactions" option in Gromacs 2018.1[4-5] (see below for details). We solvated 54 polymer chains in a box with initial dimensions 20×20×20 nm$^3$ with Martini polarizable water model[6] using Packmol[7].

TABLE 2

The components of simulation box for systems using PNIPAM polymer and different spiropyran molecules.

| System | | Molecules | Number |
|---|---|---|---|
| PNIPAM polymer | 1a dark | Polymer chains | 54 |
| | | Water | 61857 |
| | | Cl$^-$ | 108 |
| | 1a light | Polymer chains | 54 |
| | | Water | 61807 |
| | 1b dark | Polymer chains | 54 |
| | | Water | 61831 |
| | 1b light | Polymer chains | 54 |
| | | Water | 61778 |
| | | Na$^+$ | 108 |
| | 1d dark | Polymer chains | 54 |
| | | Water | 61623 |
| | | Na$^+$ | 108 |
| | 1d light | Polymer chains | 54 |
| | | Water | 61579 |
| | | Na$^+$ | 216 |

All coarse-grained simulations were performed using Gromacs 2018.1 software according to the following protocol. We first minimized for 1000 steps using steepest descent method. Then, we ran a constant volume (NVT) simulation for 1 ns using 10 fs time step at 298 K. At the end of this step, we check the distance between all cross-linker beads and added a bond between two cross-linkers with they were less than 1 nm away from each other. We assume that each cross-linker can only make one bond and once a bond is made between two cross-linkers it cannot be broken. The bond between cross-linkers was modeled with a harmonic potential with equilibrium bond length 0.33 nm and force constant 5000 kJ/mol/nm$^2$. In the second step of the equilibration, we ran a constant pressure (NPT) simulation with 20 fs time step for 50 ns at 298 K and 1 bar pressure. At the end of this step, we updated the list of bonds between cross-linkers. Following the equilibration, we performed a production for 10 s (5 s for OEGMA and DEGMA polymers) using NPT ensemble with 20 fs time step. The compressibility for the pressure coupling was $3 \times 10^{-4}$ bar$^{-1}$. The cutoff for Lennard-Jones potential was 12 Å and the LJ potential was smoothly shifted to zero between 9 Å and 12 Å. The cutoff used for Coulombic potential was also 12 Å. For electrostatic interactions, we used the group method with dielectric constant 2.5, which is appropriate for polarizable Martini water model. For LJ potential a group cutoff was used. Verlet cutoff scheme was used for neighbor search. The neighbor list was updated every 10 steps. Martini constraints were handled using the LINCS algorithm[7]. Periodic boundary conditions were applied in all directions. The temperature was maintained at 298 K using a velocity-rescaling thermostat with coupling constant of 1.0 ps. For constant pressure simulations (NPT), isotropic pressure coupling was applied using a Berendsen thermostat with a coupling constant of 5.0 ps. The compressibility for the pressure coupling was $4.5 \times 10^{-5}$ bar$^{-1}$. In order to increase the statistical accuracy and show the reproducibility of our simulations, we repeated each simulation three times starting from the initial structures using the same procedure with different initial randomized velocities.

We quantified the clustering of the spiropyran monomers in the gel using a geometric criterion based on the radial distribution function between spiropyran monomers. For each system, we counted the number of spiropyrans that were within a radius of 7 Å of other spiropyrans.

We extended our CG model to these additional polymer systems in an attempt to understand how the hydrophobicity of the side chain affects the interaction of the spiropyrans in light and dark conditions. Although the chemical structure of the spiropyran is the same in these systems, the interactions of the rest of the polymer with other parts of the system directly influence the ability of the spiropyrans to interact with each other and water. When we switch to a hydrophilic polymer, we see less clustering of spiropyrans (Figure S13b) and more interaction with water (Figure S13c) in both light and dark conditions. Interaction of spiropyrans with other spiropyrans in the polymer matrix decreases as the side chain of the polymer becomes longer. The longer and bulkier chains of P(OEGMA) make it impossible for spiropyrans to find other spiropyrans in both dark and light conditions, resulting in no change in gel volume. The light-induced switch from MCH$^-$ to SP$^{2-}$ causes a larger change in spiropyran clustering for low LCST polymer (0% OEGMA) compared to high LCST polymer (100% OEGMA) and P(NIPAM), which results in the high expansion ratios observed experimentally.

Example 4

Photoexpansion and Artificial Muscles

Equilibrium of Isomerization Shift at Different pH Values.

We dissolved 1d moiety into water solutions with different pH values (2.37, 3.37, 4.41, 5.53, 6.01) to obtain a final concentration of 0.1 mM. These solutions were put in the dark overnight to obtain equilibrium state before UV-Vis measurement. Absorbance spectroscopy of these solutions were collected using a 1 mm path length, demountable quartz cuvette on a Shimadzu UV-1800 UV spectrophotometer. The equilibrium shifting process was tracked once pH changed from 2.37 to 6.01 by collecting the absorbance spectroscopy every 5 s until the absorbance of MCH$^-$ (425 nm) was constant.

Photoexpansion in Water Solutions with Different pH Values

Hydrogel samples was put in water containing 5 mM of HCl to protonate the merocyanine form, followed by transferred to water solutions with different pH values. The photoactuation was immediately started by irradiating light on the hydrogel samples. Photographs were taken during this process and the volume ratio was calculated based on the size change of the samples. For the sequential stimuli (pH→light), hydrogel sample was transferred to water solutions with different pH values in the dark during which photographs were taken until the size of the hydrogel samples did not change. At this time point, light is turned on and photographs were taken until the size of the hydrogel samples did not change. The opposite sequence (light→pH) were carried out by irradiation with light in acidic water (5 mM of HCl) first followed by transferred the hydrogel sample to another water solution with a higher pH value.

Lower Critical Solution Temperature (LCST) Measurement

Poly(DEGMA$_x$-co-OEGMA$_y$) was prepared by using different molar ratios of di(ethylene glycol) methyl ether methacrylate (DEGMA) and oligo(ethylene glycol) methyl ether methacrylate (OEGMA, M$_n$ 500) following the same copolymerization condition for hydrogel preparation but in the absence of MBAAm crosslinker. The resultant copolymers were diluted to 3 mg/ml followed by transmittance measurement from 5° C. to 90° C. with a heating rate 1° C./min. The transmittance value was collected every 30 s and the LCST was obtained from the first derivative of the transmittance curve.

Artificial Muscle Related Experiments

The artificial muscles containing 1a-1d moieties (~1 mm in diameter and ~3 cm in length) were protonated in 5 mM of HCl first, followed by transferring to a water solution (pH 6.01) and held from top. Photoinduced bending experiments were carried out by irradiation blue light (450 nm, 0.35 mW/cm$^2$) from left, during which photographs were taken every 10 s. Bending kinetics were obtained by quantifying the bending angle vs irradiation time. Reversibility was achieved by turning off the light source to allow the muscles re-contraction in the dark in 5 mM of HCl.

REFERENCES

The following references, some of which are cited above by number, are herein incorporated by reference in their entireties.

1. Smith, W. K.; Vogelmann, T. C.; DeLucia, E. H.; Bell, D. T.; Shepherd, K. A., Leaf form and photosynthesis. *Bioscience* 1997, 47 (11), 785-793.
2. Palczewski, K., Chemistry and Biology of the Initial Steps in Vision: The Friedenwald Lecture. *Invest. Ophth. Vis. Sci.* 2014, 55 (10), 6651-6672.
3. Burgie, E. S.; Vierstra, R. D., Phytochromes: An Atomic Perspective on Photoactivation and Signaling. *Plant Cell* 2014, 26 (12), 4568-4583.
4. Li, Q.; Schenning, A. P. H. J.; Bunning, T. J., Light-Responsive Smart Soft Matter Technologies. *Adv. Opt. Mater.* 2019, 7 (16), 1901160.
5. Lancia, F.; Ryabchun, A.; Katsonis, N., Life-like motion driven by artificial molecular machines. *Nat. Rev. Chem.* 2019, 3 (9), 536-551.
6. Weingarten, A. S.; Kazantsev, R. V.; Palmer, L. C.; McClendon, M.; Koltonow, A. R.; Samuel, A. P. S.; Kiebala, D. J.; Wasielewski, M. R.; Stupp, S. I., Self-assembling hydrogel scaffolds for photocatalytic hydrogen production. *Nat. Chem.* 2014, 6 (11), 964-970.
7. Yang, X. G.; Wang, D. W., Photocatalysis: From Fundamental Principles to Materials and Applications. *Acs Appl. Energy Mater.* 2018, 1 (12), 6657-6693.
8. Fu, Y. X.; Han, H. H.; Zhang, J. J.; He, X. P.; Feringa, B. L.; Tian, H., Photocontrolled Fluorescence "Double-Check" Bioimaging Enabled by a Glycoprobe-Protein Hybrid. *J. Am. Chem. Soc.* 2018, 140 (28), 8671-8674.

9. Hohl, D. K.; Weder, C., (De)bonding on Demand with Optically Switchable Adhesives. *Adv. Opt. Mater.* 2019, 7 (16), 1900230.

10. Ouyang, L. L.; Highley, C. B.; Sun, W.; Burdick, J. A., A Generalizable Strategy for the 3D Bioprinting of Hydrogels from Nonviscous Photo-crosslinkable Inks. *Adv. Mater.* 2017, 29 (8), 1604983.

11. Aonbangkhen, C.; Zhang, H. Y.; Wu, D. Z.; Lampson, M. A.; Chenoweth, D. M., Reversible Control of Protein Localization in Living Cells Using a Photocaged-Photocleavable Chemical Dimerizer. *J. Am. Chem. Soc.* 2018, 140 (38), 11926-11930.

12. Ruskowitz, E. R.; DeForest, C. A., Photoresponsive biomaterials for targeted drug delivery and 4D cell culture. *Nat. Rev. Mater.* 2018, 3 (2), 17087.

13. Hu, Y.; Li, Z.; Lan, T.; Chen, W., Photoactuators for Direct Optical-to-Mechanical Energy Conversion: From Nanocomponent Assembly to Macroscopic Deformation. *Adv. Mater.* 2016, 28 (47), 10548-10556.

14. Gelebart, A. H.; Mulder, D. J.; Varga, M.; Konya, A.; Vantomme, G.; Meijer, E. W.; Selinger, R. L. B.; Broer, D. J., Making waves in a photoactive polymer film. *Nature* 2017, 546 (7660), 632-636.

15. Zeng, H.; Wasylczyk, P.; Wiersma, D. S.; Priimagi, A., Light Robots: Bridging the Gap between Microrobotics and Photomechanics in Soft Materials. *Adv. Mater.* 2018, 30 (24), 1703554.

16. Bertrand, O.; Gohy, J. F., Photo-responsive polymers: synthesis and applications. *Polym. Chem.* 2017, 8 (1), 52-73.

17. Lu, X. L.; Guo, S. W.; Tong, X.; Xia, H. S.; Zhao, Y., Tunable Photocontrolled Motions Using Stored Strain Energy in Malleable Azobenzene Liquid Crystalline Polymer Actuators. *Adv. Mater.* 2017, 29 (28), 1606467.

18. White, T. J.; Broer, D. J., Programmable and adaptive mechanics with liquid crystal polymer networks and elastomers. *Nat Mater* 2015, 14 (11), 1087-1098.

19. Wang, C.; Chen, Q.; Sun, F.; Zhang, D. Q.; Zhang, G. X.; Huang, Y. Y.; Zhao, R.; Zhu, D. B., Multistimuli Responsive Organogels Based on a New Gelator Featuring Tetrathiafulvalene and Azobenzene Groups: Reversible Tuning of the Gel-Sol Transition by Redox Reactions and Light Irradiation. *J. Am. Chem. Soc.* 2010, 132 (9), 3092-3096.

20. Li, L.; Scheiger, J. M.; Levkin, P. A., Design and Applications of Photoresponsive Hydrogels. *Adv. Mater.* 2019, 31 (26), 1807333.

21. Kloxin, A. M.; Kasko, A. M.; Salinas, C. N.; Anseth, K. S., Photodegradable Hydrogels for Dynamic Tuning of Physical and Chemical Properties. *Science* 2009, 324 (5923), 59-63.

22. Muraoka, T.; Koh, C. Y.; Cui, H. G.; Stupp, S. I., Light-Triggered Bioactivity in Three Dimensions. *Angew. Chem. Int. Ed.* 2009, 48 (32), 5946-5949.

23. Qian, X.; Zhao, Y.; Alsaid, Y.; Wang, X.; Hua, M.; Galy, T.; Gopalakrishna, H.; Yang, Y.; Cui, J.; Liu, N.; Marszewski, M.; Pilon, L.; Jiang, H.; He, X., Artificial phototropism for omnidirectional tracking and harvesting of light. *Nat. Nanotech.* 2019, 14 (11), 1048-1055.

24. Russew, M. M.; Hecht, S., Photoswitches: From Molecules to Materials. *Adv. Mater.* 2010, 22 (31), 3348-3360.

25. Merino, E., Synthesis of azobenzenes: the coloured pieces of molecular materials. *Chem. Soc. Rev.* 2011, 40 (7), 3835-3853.

26. Irie, M., Diarylethenes for memories and switches. *Chem. Rev.* 2000, 100 (5), 1685-1716.

27. Waldeck, D. H., Photoisomerization Dynamics of Stilbenes. *Chem. Rev.* 1991, 91 (3), 415-436.

28. Kortekaas, L.; Browne, W. R., The evolution of spiropyran: fundamentals and progress of an extraordinarily versatile photochrome. *Chem. Soc. Rev.* 2019, 48 (12), 3406-3424.

29. Takashima, Y.; Hatanaka, S.; Otsubo, M.; Nakahata, M.; Kakuta, T.; Hashidzume, A.; Yamaguchi, H.; Harada, A., Expansion-contraction of photoresponsive artificial muscle regulated by host-guest interactions. *Nat. Commun.* 2012, 3, 1270.

30. Chen, J. W.; Leung, F. K. C.; Stuart, M. C. A.; Kajitani, T.; Fukushima, T.; van der Giessen, E.; Feringa, B., Artificial muscle-like function from hierarchical supramolecular assembly of photoresponsive molecular motors. *Nat. Chem.* 2018, 10 (2), 132-138.

31. Klajn, R., Spiropyran-based dynamic materials. *Chem. Soc. Rev.* 2014, 43 (1), 148-184.

32. Sumaru, K.; Kameda, M.; Kanamori, T.; Shinbo, T., Characteristic phase transition of aqueous solution of poly(N-isopropylacrylamide) functionalized with spirobenzopyran. *Macromolecules* 2004, 37 (13), 4949-4955.

33. Ziolkowski, B.; Florea, L.; Theobald, J.; Benito-Lopez, F.; Diamond, D., Self-protonating spiropyran-co-NIPAM-co-acrylic acid hydrogel photoactuators. *SoftMatter* 2013, 9 (36), 8754-8760.

34. Ter Schiphorst, J.; Coleman, S.; Stumpel, J. E.; Ben Azouz, A.; Diamond, D.; Schenning, A. P. H. J., Molecular Design of Light-Responsive Hydrogels, For in Situ Generation of Fast and Reversible Valves for Microfluidic Applications. *Chem. Mater.* 2015, 27 (17), 5925-5931.

35. Epstein, E. S.; Martinetti, L.; Kollarigowda, R. H.; Carey-De La Torre, O.; Moore, J. S.; Ewoldt, R. H.; Braun, P. V., Modulating Noncovalent Cross-links with Molecular Switches. *J. Am. Chem. Soc.* 2019, 141 (8), 3597-3604.

36. Sendai, T.; Biswas, S.; Aida, T., Photoreconfigurable Supramolecular Nanotube. *J. Am. Chem. Soc.* 2013, 135 (31), 11509-11512.

37. Kundu, P. K.; Das, S.; Ahrens, J.; Klajn, R., Controlling the lifetimes of dynamic nanoparticle aggregates by spiropyran functionalization. *Nanoscale* 2016, 8 (46), 19280-19286.

38. Xiao, Y.; Zarghami, S.; Wagner, K.; Wagner, P.; Gordon, K. C.; Florea, L.; Diamond, D.; Officer, D. L., Moving Droplets in 3D Using Light. *Adv. Mater.* 2018, 30 (35), 1801821.

39. Satoh, T.; Sumaru, K.; Takagi, T.; Kanamori, T., Fast-reversible light-driven hydrogels consisting of spirobenzopyran-functionalized poly(N-isopropylacrylamide). *SoftMatter* 2011, 7 (18), 8030-8034.

40. Francis, W.; Dunne, A.; Delaney, C.; Florea, L.; Diamond, D., Spiropyran based hydrogels actuators-Walking in the light. *Sensor Actuat. B-Chem.* 2017, 250, 608-616.

41. Kohl-Landgraf, J.; Braun, M.; Ozcoban, C.; Goncalves, D. P. N.; Heckel, A.; Wachtveitl, J., Ultrafast Dynamics of a Spiropyran in Water. *J. Am. Chem. Soc.* 2012, 134 (34), 14070-14077.

42. Moldenhauer, D.; Grohn, F., Water-Soluble Spiropyrans with Inverse Photochromism and Their Photoresponsive Electrostatic Self-Assembly. *Chem. Eur. J.* 2017, 23 (16), 3966-3978.

The invention claimed is:
1. A compound of formula (I):

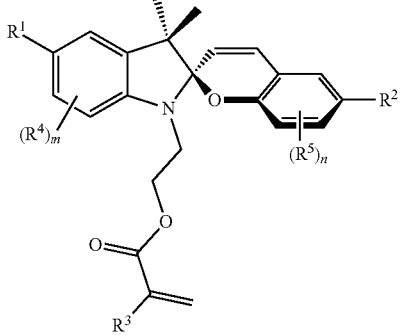

(I)

or a salt thereof, wherein:
$R^1$ is —$SO_3H$;
$R^2$ is selected from hydrogen and —$SO_3H$;
$R^3$ is selected from hydrogen and methyl;
m and n are each independently 0, 1, or 2; and
$R^4$ and $R^5$ are each independently selected from $C_1$-$C_3$ alkyl, $C_1$-$C_3$ alkoxy, halo, and nitro.

2. The compound of claim 1, or a salt thereof, wherein $R^1$ and $R^2$ are both —$SO_3H$.

3. The compound of claim 1, or a salt thereof, wherein $R^3$ is methyl.

4. The compound of claim 1, or a salt thereof, wherein m and n are 0.

5. The compound of claim 1, wherein the compound is selected from:

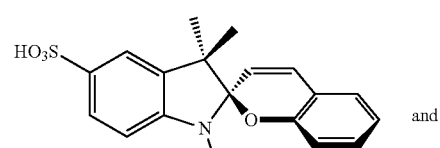

and

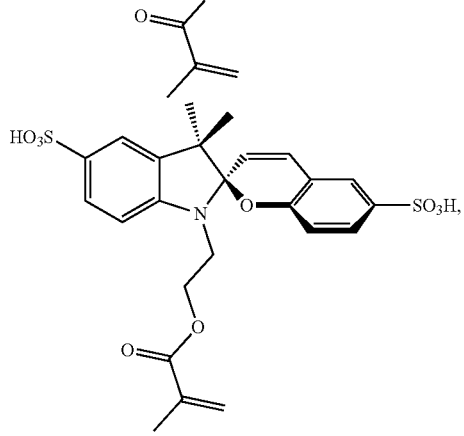

or a salt thereof.

6. The compound of claim 1, wherein the compound is a sodium salt or a potassium salt.

7. The compound of claim 6, wherein the compound is selected from:

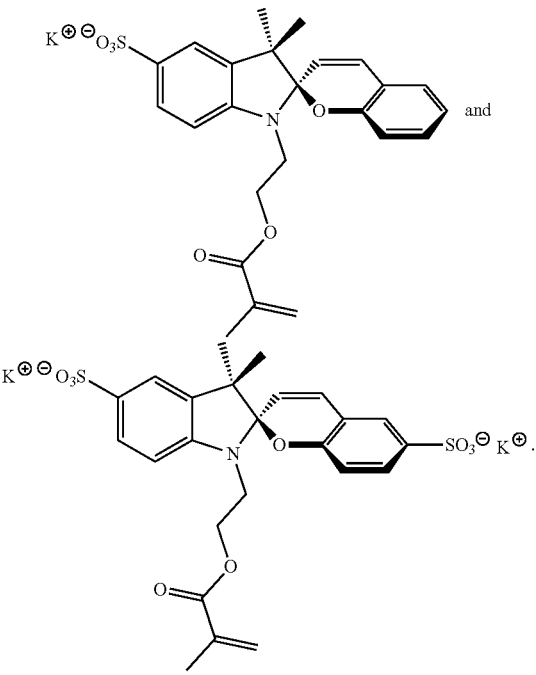

and

8. A compound of formula (Ia):

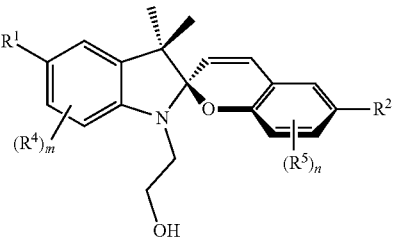

(Ia)

or a salt thereof, wherein:
$R^1$ is —$SO_3H$;
$R^2$ is selected from hydrogen and —$SO_3H$;
m and n are each independently 0, 1, or 2; and
$R^4$ and $R^5$ are each independently selected from $C_1$-$C_3$ alkyl, $C_1$-$C_3$ alkoxy, halo, and nitro.

9. A polymer comprising a monomer unit of formula (II):

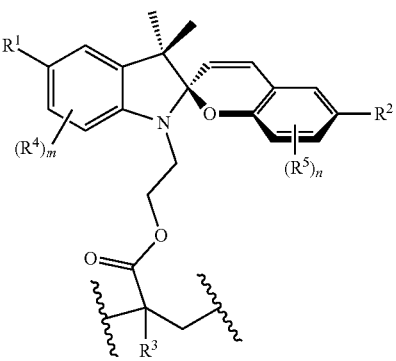

(II)

or a salt thereof, wherein:
R$^1$ is —SO$_3$H;
R$^2$ is selected from hydrogen and —SO$_3$H;
R$^3$ is selected from hydrogen and methyl;
m and n are each independently 0, 1, or 2; and
R$^4$ and R$^5$ are each independently selected from C$_1$-C$_3$ alkyl, C$_1$-C$_3$ alkoxy, halo, and nitro,
wherein each

represents a point of attachment to the polymer chain.

10. The polymer of claim 9, or a salt thereof, wherein R$^1$ and R$^2$ are both —SO$_3$H.

11. The polymer of claim 9, or a salt thereof, wherein R$^3$ is methyl.

12. The polymer of claim 9, or a salt thereof, wherein m and n are 0.

13. The polymer of claim 9, wherein the monomer unit has a formula selected from:

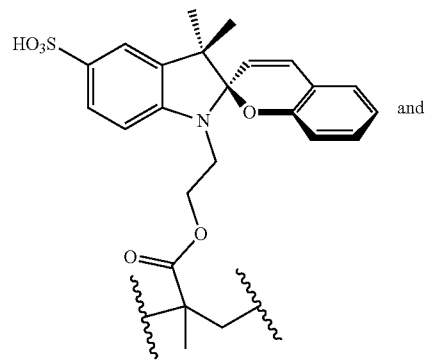

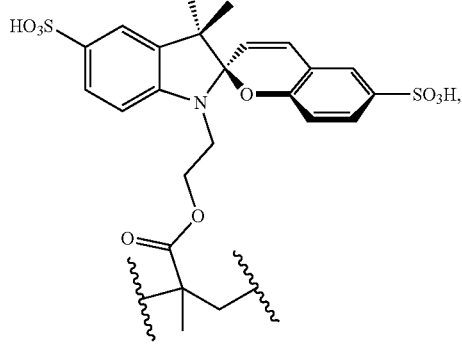

or a salt thereof.

14. The polymer of claim 13, wherein the monomer unit is in sodium or potassium salt form.

15. The polymer of claim 14, wherein the monomer unit has a formula selected from:

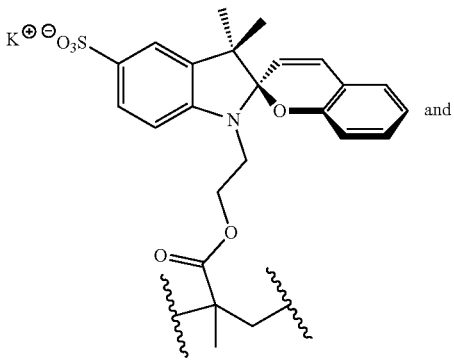

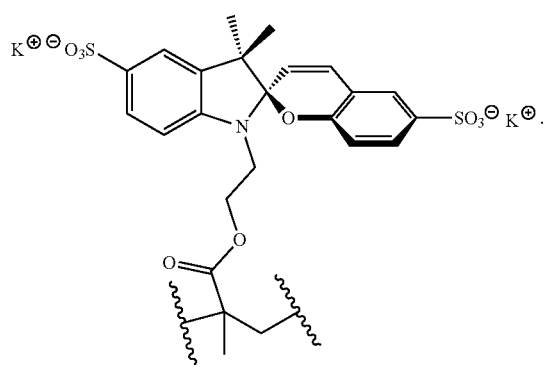

16. The polymer of claim 9, further comprising one or more additional monomers selected from N-isopropylacrylamide, di(ethylene glycol) methyl ether methacrylate, oligo(ethylene glycol) methyl ether methacrylate, and any combination thereof.

17. The polymer of claim 9, further comprising one or more crosslinking monomers.

18. The polymer of claim 17, wherein the crosslinking monomer is N,N'-methylenebis(acrylamide).

19. A method of triggering volumetric expansion of a hydrogel comprising a compound of claim 1, the method comprising exposing the hydrogel to light.

20. A method of triggering volumetric contraction of a hydrogel comprising a compound of claim 1, the method comprising exposing the hydrogel to darkness.

* * * * *